US012430976B2

(12) United States Patent
Shute

(10) Patent No.: US 12,430,976 B2
(45) Date of Patent: Sep. 30, 2025

(54) STORAGE APPARATUS

(71) Applicant: Volumatic Limited, Coventry (GB)

(72) Inventor: Neil Alexander Shute, Coventry (GB)

(73) Assignee: Volumatic Limited, Coventry (GB)

( * ) Notice: Subject to any disclaimer, the term of this patent is extended or adjusted under 35 U.S.C. 154(b) by 0 days.

(21) Appl. No.: 18/270,399

(22) PCT Filed: Jan. 28, 2022

(86) PCT No.: PCT/GB2022/050235
§ 371 (c)(1),
(2) Date: Jun. 29, 2023

(87) PCT Pub. No.: WO2022/162383
PCT Pub. Date: Aug. 4, 2022

(65) Prior Publication Data

US 2024/0304051 A1 Sep. 12, 2024

(30) Foreign Application Priority Data

Jan. 28, 2021 (GB) ...................................... 2101221

(51) Int. Cl.
*G07D 11/125* (2019.01)

(52) U.S. Cl.
CPC .................................. *G07D 11/125* (2019.01)

(58) Field of Classification Search
CPC ...... G07D 11/125; G07D 11/14; G07D 11/12; G07F 9/06; G07F 7/04
See application file for complete search history.

(56) References Cited

U.S. PATENT DOCUMENTS 5,850,966 A * 12/1998 Siler .................... G07D 11/125 109/46
7,059,599 B2 * 6/2006 Lewis .................. G07D 11/125 232/15

(Continued)

FOREIGN PATENT DOCUMENTS

EP 1503351 A2 2/2005
EP 2648165 A1 10/2013

(Continued)

OTHER PUBLICATIONS

Combined Search and Examination Report Under Sections 17 & 18(3) for related Great Britain Application No. GB2101221.6 dated Jun. 30, 2021.

(Continued)

*Primary Examiner* — William L Miller
(74) *Attorney, Agent, or Firm* — Caesar Rivise, PC

(57) ABSTRACT

An apparatus (1) for securely retaining documents, the apparatus (1) comprises a substantially planar cover plate (4) and a receptacle, the receptacle comprising a frame (3) and a pouch secured to the frame (3), the frame (3) comprising an opening (O) to access the pouch, the cover plate (4) being configured in use to cover the opening (O) of the frame (3) and to prevent access to the interior of the receptacle when the cover plate (4) is in a closed position, the apparatus comprises (1) a lock (5, 6) configured to irreversibly lock the cover plate (4) in the closed position on the receptacle, wherein the lock (5, 6) comprises at least one elongate flexible arm (6) which is configured to flex in the direction of the plane of the cover plate (4) as the cover plate (4) is moved towards the closed position on the frame.

17 Claims, 13 Drawing Sheets

(56) References Cited

U.S. PATENT DOCUMENTS

| | | | | |
|---|---|---|---|---|
| 7,819,306 | B2 * | 10/2010 | Williams | G07D 11/125<br>220/345.2 |
| 8,434,673 | B2 * | 5/2013 | Johnson | G07D 11/125<br>220/345.2 |
| 8,584,603 | B2 * | 11/2013 | Villiger | G07D 11/12<br>232/15 |
| 11,423,730 | B2 * | 8/2022 | Williams | G07D 11/125 |
| 12,039,822 | B2 * | 7/2024 | Shute | G07D 11/125 |
| 2006/0071412 | A1 * | 4/2006 | Lewis | G07D 11/125<br>232/15 |
| 2008/0223915 | A1 * | 9/2008 | Williams | G07D 11/125<br>232/1 D |
| 2010/0193582 | A1 * | 8/2010 | Johnson | G07D 11/125<br>232/1 D |
| 2011/0271879 | A1 | 11/2011 | Villiger | |
| 2013/0138242 | A1 * | 5/2013 | Kallin | G07D 11/0096<br>383/59 |
| 2020/0202656 | A1 * | 6/2020 | Williams | G07D 11/125 |
| 2022/0301379 | A1 * | 9/2022 | Yamamoto | B65H 31/22 |
| 2023/0343161 | A1 * | 10/2023 | Shute | G07D 11/125 |

FOREIGN PATENT DOCUMENTS

| | | |
|---|---|---|
| EP | 2140431 B1 | 8/2014 |
| GB | 2579725 A | 7/2020 |

OTHER PUBLICATIONS

International Search Report for corresponding PCT Application No. PCT/GB2022/050235 dated May 9, 2022.

* cited by examiner

STORAGE APPARATUS

CROSS-REFERENCE TO RELATED APPLICATIONS

This application is a U.S. National Phase Application of PCT/GB2022/050235, filed Jan. 28, 2022, which claims priority to GB2101221.6, filed Jan. 28, 2021, the contents of GB2101221.6 are incorporated herein by reference in its entireties for all purposes.

BACKGROUND

This invention relates generally to an apparatus for the secure storage of valuable documents such as bank notes. More specifically, although not exclusively, this invention relates to an apparatus comprising a cover plate and a receptacle for the secure storage of valuable documents such as bank notes.

Typically, at a point of sale such as a cashier's desk in a supermarket, a container is provided beneath the desk for the intermittent receipt of bank notes. The container may be used to store notes as they are taken from customers, and/or as an overflow for a till on or in the desk. For example, when the collected notes of a particular denomination in the till reach a given level the notes (or a portion thereof) may be transferred to the container, thereby offering enhanced security compared to keeping the store of notes in the till. Periodically, containers loaded with stored bank notes are taken by security personnel to a bank or other secure storage facility. More usually, however, containers loaded with stored bank notes are taken by staff to a central counting room, where the bank notes are counted and bagged for transport to the bank or other secure facility.

Some containers currently in use are rigid boxes which slide into and out of guides beneath a counter whereby they are supported. Provision is normally made for locking the containers in position. The front face of such a container is typically upwardly inclined and has an exposed top opening through which one or more notes can be inserted. Behind the inclined front face is a barrier with a central, vertical slot. A plunger mechanism, hinged near the bottom of the barrier, can be manipulated (when bank notes have been inserted) to push them through the slot into the cavity within the container. Containers of this kind have numerous drawbacks. They are expensive to produce and are not adequately tamper proof. Further, money positioned behind the slotted barrier is still accessible through the opening and can be "fished out" using, for example, adhesive tape. Moreover, the relatively clumsy plunger mechanism can trap fingers and damage nails.

An advance in the storage of cash at point-of-sale terminals has been marketed and sold by the current applicant under the trade mark Counter Cache Intelligent or CCi (both RTM). This device stores received documents (e.g. valuable documents such as bank notes and the like) in a receptacle. It is particularly desirable, and is known, to lock (e.g. irreversibly lock) a cover to the receptacle, so that the contents of the receptacle cannot be accessed during storage or transport of the apparatus. As used herein, the term "irreversibly lock" means that the cover either cannot be removed from the receptacle or that removal of the cover from the receptacle can only be affected through breaking or otherwise tamper-evidently damaging a component of the apparatus.

EP1503351 comprises apparatus for use in the CCi device. The apparatus comprises a receptacle formed from a rigid frame spanned by a flexible pouch, the frame having parallel sides provided with channels which receive side edges of a cover in the form of a plate. The cover plate is slidable along the channels to close the frame and thereby prevent access to the contents of the receptacle. The leading end of the cover forms an irreversible lock with the frame when fully inserted therein.

Other apparatus are known, for example as shown in EP2140431. The apparatus disclosed therein comprise a similar receptacle and cover plate arrangement. The frame comprises a lock end to form an irreversible lock with the leading end of the cover plate when it is inserted therein. The frame is made by securing a lock component to a frame body. Similarly, the cover plate is made by securing a lock component to a cover plate body. Other portions of the frame, e.g. at the opposite end to the lock end may be secured to the frame body. Again, other portions of the cover plate, e.g. at the trailing end, may be secured to the cover plate body. Moreover, the lock component connected to the frame and/or to the cover plate may be formed in two or more parts.

SUMMARY

It is a non-exclusive object of the invention to provide an apparatus which forms a more secure engagement between the cover and the receptacle.

It is a non-exclusive object of the invention to simplify the manufacture of receptacles without, for example, compromising security.

Accordingly, a first aspect of the invention provides an apparatus for securely retaining documents, the apparatus comprising a substantially planar cover plate and a receptacle, the receptacle comprising a frame and a pouch secured to the frame, the frame comprising an opening to access the pouch, the cover plate is configured in use to cover the opening of the frame and to prevent access to the interior of the receptacle when the cover plate is in a closed position, the apparatus comprises a lock or locking means configured to irreversibly lock the cover plate into the closed position on the receptacle; wherein the lock or locking means comprises at least one elongate flexible arm which is configured to flex in the direction of the plane of the cover plate, e.g. as the cover plate is moved towards the closed position on the frame.

The cover plate may comprise a leading end or edge and a trailing end or edge. The frame may comprise a first end locatable or located adjacent the leading end of the cover plate, when the apparatus is in a closed position. The frame may comprise a second end locatable or located adjacent the trailing end of the cover plate, when the apparatus is in a closed position.

In embodiments, the lock or locking means may comprise more than one elongate flexible arm, e.g. two, three, 'n' or more elongate flexible arms. The, some, or all of the elongate flexible arms may extend or project from the leading end or edge of the cover plate.

A further aspect of the invention provides an apparatus for securely retaining documents, the apparatus comprising a substantially planar cover plate and a receptacle, the receptacle comprising a frame and a pouch secured to the frame, the frame comprising an opening to access the pouch, the cover plate is configured in use to cover the opening of the frame and to prevent access to the interior of the receptacle when the cover plate is in a closed position, the apparatus comprises a lock or locking means configured to irreversibly lock the cover plate into the closed position on the receptacle, wherein the lock or locking means comprises more than one elongate flexible arm.

The, some, or all of the elongate flexible arms may extend or project from a leading end or edge of the cover plate.

The following features apply to any aspect of the invention.

The cover plate may be slidingly engaged on the frame.

The lock or locking means may comprise two or more (e.g. three or four, or more) elongate flexible arms. The lock or locking means may comprise a first elongate flexible arm and a second elongate flexible arm. The lock or locking means may comprise a pair of elongate flexible arms, for example wherein each elongate flexible arm is a mirror image of one another. The lock or locking means may comprise two dissimilar elongate flexible arms, e.g. that are not mirror images of one another.

In embodiments wherein the lock or locking means comprises a first and second elongate arm, the first and second elongate flexible arm may be configured to flex toward one other in the direction of the plane of the cover plate. Alternatively, the first and second elongate flexible arm may be configured to flex away from each other in the direction of the plane of the cover plate.

Alternatively, the lock or locking means may comprise a first elongate flexible arm configured to flex in the direction of the plane of the cover plate, and a second elongate flexible arm configured to flex in the direction transverse to the plane of the cover plate.

Alternatively, the lock or locking means may comprise a first elongate flexible arm configured to flex in the direction transverse to the plane of the cover plate, and a second elongate flexible arm configured to flex in the direction transverse to the plane of the cover plate and frame.

In embodiments, the at least one flexible arm, for example the first and second elongate flexible arms may comprise an equilibrium position when in a resting position. The at least one flexible arm, for example each of the first and second elongate flexible arms may comprise a stressed position when the at least one flexible arm, for example one or more of the first and/or second elongate flexible arm(s) is in a flexed position. The at least one flexible arm may describe a larger or smaller arc in the stressed position than in the equilibrium position. The maximum lateral dimension of at least two flexible arms, e.g. the first and second elongate flexible arms, when in the equilibrium position may be larger than the maximum lateral dimension of the at least two flexible arms, e.g. the first and second elongate flexible arms, when in the stressed position. Alternatively, the maximum lateral dimension of the at least two elongate flexible arms, e.g. the first and second elongate flexible arms, when in the equilibrium position may be smaller than the maximum lateral dimension of the at least two, e.g. the first and second elongate flexible arms, when in the stressed position.

In embodiments, the or one or more than one (e.g. two) of the at least one elongate flexible arm(s) may comprise a proximal portion and a free distal end. The, one or more (e.g. two) of the at least one elongate flexible arm(s) may comprise a laterally extending portion located at or towards the free distal end. The laterally extending portion may extend in a direction that is substantially perpendicular to the proximal portion of the at least one elongate flexible arm.

In embodiments, the laterally extending portion may comprise an abutment surface, which may extend in a direction which is, for example, parallel to or angled obliquely (e.g. acutely) with respect to the leading end of the cover plate and/or the first end of the frame. The laterally extending portion may comprise a ramp portion. The ramp portion may extend between the distal end and the abutment surface.

In embodiments, one or more (e.g. two) of the at least one elongate flexible arm(s) may comprise an aperture located through the proximal portion, e.g. a centrally located aperture.

The at least one elongate arm may be formed as an at least partially hollow body. Advantageously by making the arm at least partially hollow it is possible to form (e.g. mould) that component of the lock in one piece, i.e. as a unitary part). Indeed, by careful selection of the components and their form it is possible to mould the cover plate and/or the frame including the at least one elongate flexible arm in one piece.

In embodiments, the lock may comprise a male member. In embodiments, the lock May comprise a female member. In embodiments the lock may comprise a male and female member.

In embodiments, one of the male member or the female member is located on one of the first end of the frame or the leading end of the cover plate, and the other of the male member or the female member is located on the other of the first end of the frame or the leading end of the cover plate.

The male member may be located on the cover plate. The male member may be located or locatable at the leading end of the cover plate. The male member may project from the leading end of the cover plate. Alternatively, the male member may be located or locatable on the frame. The male member may be located or locatable on the first end of the frame. The male member may project from the first end of the frame.

In embodiments, both the cover plate and the frame may comprise a male member. In embodiments, both the cover plate and the frame may comprise a female member.

In embodiments, the male member comprises one or more of the at least one elongate flexible arm(s).

In embodiments, the male member may comprise a base portion. The base portion may project from the leading end of the cover plate or the first end of the frame. The at least one elongate flexible arm, e.g. two or more elongate flexible arms, may be or may not be directly secured or attached to the base portion of the male member. In embodiments, the at least one elongate flexible arm, e.g. two or more elongate flexible arms, may project or extend from the leading end of the cover plate.

In embodiments, the male member may comprise a platform. The platform may project from the leading end of the cover plate or the first end of the frame. The base portion may be secured to one or more of the platform and/or the leading end of the cover plate or the first end of the frame. In embodiments, the at least one elongate flexible arm, e.g. two or more elongate flexible arms, may project or extend from the leading end of the cover plate, for example via the platform of the male member.

In embodiments, the female member may be located or locatable on the frame. The female member may be located or locatable on the first end of the frame. The female member may project from the first end of the frame. In alternative embodiments, the female member may be located or locatable on the cover plate. The female member may project from the leading end of the cover plate.

In embodiments, the female member comprises a cavity, e.g. a blind cavity, extending between an opening and an end. The female member may be formed from walls and may comprise a base wall, a top wall, and at least one side wall, e.g. two opposed side walls, extending between the base wall and the top wall. In embodiments, the cavity is shaped to accommodate the male member to form an irreversible lock when the cover plate and the frame are in a closed condition.

In embodiments, the cavity has an initial width between two opposed side walls adjacent the opening. In embodiments, the cavity has a final width between two opposed walls proximate or adjacent the end of the cavity. In embodiments, the cavity has an intermediate width between two opposed walls between the opening and the end of the cavity. The intermediate width may be less than either or both of the initial width or final width individually. In embodiments, the width between the opposing walls of the cavity may taper or narrow from the initial width to the intermediate width. In embodiments, the width between the opposing walls of the cavity may widen from the intermediate width to provide the final width.

The maximum lateral dimension of the at least one, say two flexible arms, for example one or more of the, or a first and second, elongate flexible arm, when in the equilibrium position may be smaller than the initial width of the cavity. The maximum lateral dimension of the at least one, say two flexible arms, e.g. a first and second elongate flexible arm, for example one or more of the elongate flexible arms when in the equilibrium position may be larger than the intermediate width. For example, a portion of the at least one flexible arm, when brought toward the cavity will be caused to move from an equilibrium position to or towards a stressed position, thereby to allow the at least one flexible arm to pass into the cavity. A portion of said at least one arm and a component of the cavity may interferer as they travel towards one another to allow accommodating of the said at least one arm within the cavity.

One or more walls of the female member may comprise a ramp. For example, the top wall, the base wall and/or one or more opposed side wall(s) of the female member may comprise a ramp. One or more opposed side walls may be configured to contact a or the or one or more ramped portion(s) of the laterally extending portions of the at least one elongate flexible arm when the male member is at least partially inserted into the female member. For example, in use contact of the ramped portion of a or the laterally extending portion of the male member with a side wall or ramp of the female member may cause said at least one elongate flexible arm to flex, for example, in the direction of the plane of the cover plate.

The cavity may comprise a retaining surface. The retaining surface may be formed by the widening of the opposing walls from the intermediate width to the final width. The retaining surface may be substantially parallel to or obliquely angled to the first end of the frame and/or the leading end of the cover plate. In use, the retaining surface may be configured to cooperate with and engage with a or the abutment surface(s) of the at least one elongate arm, e.g. when the male member is fully inserted into the female member.

In embodiments, the cavity may comprise a raised portion, for example a centrally located raised portion. The raised portion may comprise a ramp portion and may comprise two ramp portions. In an embodiment the raised portion may be triangular, for example in plan view, for example comprising substantially symmetrical ramped outer side walls. The outer side walls may taper outwardly from the opening of the cavity to the end of the cavity. In use, the raised portion may provide an abutment retaining surface to cooperate with and engage with a or the abutment surface of the elongate flexible arm (e.g. an abutment surface on a laterally extending portion of the at least one elongate flexible arm) to form an irreversible lock when the cover plate and frame are in a closed condition.

In embodiments, the male member may comprise a protrusion extending outwardly from the base portion. In embodiments, the female member comprises a recessed portion, for example located at the innermost end of the cavity of the female member. The recessed portion may be sized and/or shaped and/or configured to accommodate a or the protrusion on the male member.

Advantageously, location of a protrusion on the male member within a recessed portion on the female member prevents lateral movement of the male member within the female member.

In embodiments, the male member may comprise an upstanding wall or rib, for example a stabilising rib. The upstanding wall or rib may be located centrally on the male member, for example, between a first elongate flexible arm and a second elongate flexible arm. Additionally, or alternatively, a or the upstanding wall or rib may be located along a side portion of the male member. The male member may comprise more than one upstanding wall or rib, e.g. a central upstanding wall or rib and a side portion upstanding wall or rib.

The upstanding wall or rib may be secured to the base portion and/or the platform of the male member. The upstanding wall or rib may contact a or the top portion of the cavity of the female member when the male member is fully inserted into the female member in a closed condition.

Advantageously, the upstanding wall or rib provides additional security by preventing movement within the cavity of the female member of the irreversible lock. The upstanding wall or rib may be configured to contact the top portion of the cavity such that an attempt to vertically flex the male member within the female member is mitigated.

The opening of the cavity of the female member has a height. The height of the opening of the cavity of the female member may be less than the height of the platform of the male member, such that the platform is prevented from entering the cavity of the female member.

Advantageously, the presence of a platform having a height that is greater than the height of the opening of the cavity prevents excess force from being applied to the male member as it is inserted into the cavity of the female member. This prevents breakage of the elongate projection(s) against walls of the cavity.

In embodiments, the base portion of the male member may be substantially flat and planar on its interior pouch-facing surface. In alternative embodiments, the base portion of the male member may comprise a lower portion on its interior pouch-facing surface. The lower portion may extend below the plane of the base portion.

In embodiments, the female member may comprise an aperture located within the base portion of the cavity. The base portion of the male member may be sized and/or shaped and/or configured to be located or seated within a correspondingly shaped aperture on the female member. The aperture of the female member may be sized and/or shaped and/or configured to seat the lower portion of the male member there within. The base portion of the male member may be sized and/or shaped and/or configured to be located or seated within the correspondingly shaped aperture on the female member.

In use, contact of the ramped portion of the laterally extending portion with an internal surface or wall of the female member may actuate the at least one elongate flexible arm to flex inwardly or outwardly in a lateral direction with respect to the plane of the cover plate and frame when inserted into the female member.

Advantageously, the provision of a lower portion positioned within an aperture of the base portion of the cavity when the apparatus is in the closed condition additionally prevents removal of the male member from the female member by providing an additional irreversible locking means. Moreover, the lower portion covers the other locking features, e.g. a first elongate flexible arm and/or a second elongate flexible arm such that these cannot be accessed or tampered with.

In embodiments, the frame may comprise one or more channel, e.g. located on one or both sides of the frame. The one or more channels may be shaped and/or configured to accommodate the sides of the cover plate. The one or more channels may additionally comprise a locking means to irreversibly lock the cover plate to the frame.

The cover plate may be substantially planar to define a cover plate plane.

A further aspect of the invention provides an apparatus for securely retaining documents, the apparatus comprising a cover plate and a receptacle, the receptacle comprising a frame and a pouch secured to the frame, the frame comprising an opening to access the pouch, the cover plate is configured in use to cover the opening of the frame and to prevent access to the interior of the receptacle when the cover plate is in a closed position, the apparatus comprises a lock or locking means configured to irreversibly lock the cover plate in the closed position on the receptacle; the cover plate comprising a leading end and a trailing end, the frame comprising a first end located or locatable adjacent the leading end of the cover plate and a second end located or locatable adjacent the trailing end of the cover plate when the apparatus is in a closed position, wherein the lock or locking means comprises at least one biased member located on either the frame or the cover plate and biased away from or towards the pouch in an equilibrium position and an abutment surface located on the other of the cover plate and the frame, the biased member being configured to engage with the abutment surface to form an irreversible lock when the frame and the cover plate are in a closed condition.

The at least one biased member may be located between the centre of the frame and the second end of the frame. The at least one biased member may be spaced from the sides. The at least one biased member may be located between the centre of the frame and the trailing edge of the cover plate. The at least one biased member may provide a serration, e.g. in the frame or the cover plate. The member of the at least one biased member may comprise an at least partially cut-out portion comprising a tab. The tab may be provided on the frame and angled away from the pouch. Alternatively, the tab may be provided on the cover plate and angled toward the pouch. Engagement of the cover plate and frame may cause the biased member, (e.g. the tab) to be urged against its bias by a complementary urging member located on the other of the frame or cover plate until it is free of the complementary urging member.

The locking means may comprise a first biased member and a second biased member. The biased member of one or more or each biased member may comprise a partially cut-out portion (e.g. a tab) having a free distal or terminal edge.

The abutment surface may comprise an upstanding wall. The upstanding wall may at least partially extend between the sides of the cover plate or the frame. The upstanding wall may be formed in more than one section, e.g. two or more sections. The upstanding wall may be configured to engage with the one or more biased members in the frame or cover plate to inhibit removal of the cover plate in a sliding manner from the frame.

In use, the biased member, e.g. of the frame, may be forced toward the pouch by the complementary urging member, e.g. of the cover plate, as the cover plate is received in a sliding manner into the frame to progress towards the closed condition. In the fully closed condition, the abutment surface (e.g. the upstanding wall), e.g. of the cover plate, may be located beyond the free distal edge of the biased member, e.g. the first biased member and the second biased member. The biased member, e.g. the free distal edge of the biased member or tab lies proximate or adjacent or abuts the abutment surface. Consequently, removal of the cover plate is prevented because the biased member interferes with the upstanding wall to prevent removal of the cover plate in a reverse sliding direction.

Alternatively, the at least one biased member is located on the cover plate and the at least one abutment surface is located on the frame to similar effect. In another embodiment, each of the frame and cover plate comprise at least one biased member and each of the cover plate and frame comprise a respective complementary urging member and abutment surface.

Advantageously, when the cover plate is coupled to the frame in a closed condition, the biased member is covered (e.g. by the cover plate and the pouch) and are therefore inaccessible when the apparatus is sealed. This mitigates tampering of the clip in an attempt to remove the cover plate to open the apparatus.

The apparatus according to any aspect of the invention may comprise a frame comprising at least one recess or cut-out portion located on the first end of the frame. The at least one recess cut-out portion may be spaced from the male member and/or female member. The at least one recess cut-out portion may be sized and/or shaped and/or configured to interact with a correspondingly shaped key located on or in a device in which the apparatus is to be inserted. In embodiments, the frame may comprise one recess cut-out portion, or may comprise more than one recess cut-out portion.

Advantageously, the cut-out portion can be configured such that only apparatus with a specific cut out or rebate can be used with specific devices. This allows, for example, specific retailers to have bespoke apparatus, whereby those of one retailer cannot be used in the devices of another retailer. Additionally, or alternatively, each till point within a retailer may use specific apparatus, thereby ensuring that the documents from one till point can be separated from those of another till point, for example to increase internal accountability.

A yet further aspect of the invention provides an apparatus for securely retaining documents, the apparatus comprising a cover plate and a receptacle, the receptacle comprising a frame and a pouch, the frame comprising an opening to access the pouch, the cover plate being configured in use to cover the opening of the frame and to prevent access to the interior of the pouch of the receptacle when the cover plate is in a closed position, the apparatus comprises a lock or locking means configured to irreversibly lock the cover plate into a closed position on the receptacle; wherein the frame has a first end and a second end, the frame comprising at least one recess or cut-out portion which is sized and/or shaped and/or configured to interact with a correspondingly shaped key located on or in the device in which the apparatus is to be installed.

A further aspect of the invention provides a combination of a device for securely receiving and storing documents and apparatus for installation in the device, the apparatus comprising a cover plate and a receptacle, the receptacle comprising a frame and a pouch, the frame comprising an opening to access the pouch, the cover plate being configured in use to cover the opening of the frame and to prevent access to the interior of the pouch of the receptacle when the cover plate is in a closed position, the apparatus comprises a lock or locking means configured to irreversibly lock the cover plate into a closed position on the receptacle, wherein the frame has a first end and a second end, the frame comprising at least one recess or cut-out portion which is sized and/or shaped and/or configured to receive a correspondingly shaped key located on or in the device when the apparatus is installed therein.

The apparatus may have any of the features previously or subsequently described. For example, the locking means configured to irreversibly lock the cover plate into a closed position on the receptacle may comprise a male member and a female member, one of the male member or the female member being located on one of the first end of the frame or the leading end of the cover plate, and the other of the male member or the female member being located on the other of the first end of the frame or the leading end of the cover plate.

The male member may comprise at least one elongate flexible arm, wherein the at least one elongate flexible arm is configured to flex in the direction of the plane of the cover plate when inserted into the female member. The male member may extend or project from the first end of the frame or the leading end of the cover plate, e.g. so that the at least one elongate flexible arm extends or projects from the first end of the frame or the leading end of the cover plate.

The at least one recess or cut-out portion on the first end of the frame may be spaced from the male member and/or the female member.

Advantageously, the presence of the recess or cut-out portion on the frame that is sized and/or shaped and/or configured to interact with a correspondingly shaped key located on or in the device, for example a CCi device prevents the use of counterfeit frames and cover plates in the Applicant's apparatus.

A yet further aspect of the invention provides a method of integrally forming a frame as a unitary item for use in an apparatus for securely retaining documents, the apparatus comprising a cover plate and a receptacle, the receptacle comprising the frame and a pouch, the frame comprising an opening to access the pouch, the cover plate is configured in use to cover the opening of the frame and to prevent access to the interior of the pouch of the receptacle when the cover plate is in a closed position, the apparatus comprises a locking means configured to irreversibly lock the cover plate into a closed position on the receptacle; wherein the frame comprises a first end and a second end, and at least one aperture located between the first end and the second end of the frame, the method comprising moulding the cover plate as a unitary item and moulding the frame as a unitary item, securing a pouch to the frame, for example using welding and/or adhesive.

The apparatus may have any of the features previously or subsequently described.

The at least one aperture may comprise an elongate aperture. The aperture, e.g. the elongate aperture, may be located at an equal spacing between the first end and the second end of the frame. The aperture, e.g. the elongate aperture, may be located in parallel to and inboard of the side of the frame, e.g. a channel of the frame. The aperture, e.g. the elongate aperture, may be located between the side of the frame and the opening, e.g. centrally between the side of the frame and the opening. The frame may comprise more than one aperture, e.g. two apertures or more than two apertures. The frame may comprise a first aperture, e.g. a first elongate aperture, and a second aperture, e.g. a second elongate aperture, the first elongate aperture being located at an equal spacing between the first end and the second end of the frame, and centrally between and in parallel relations to the first side of the frame and the opening of the frame, the second elongate aperture being located at an equal spacing between the first end and the second end of the frame, and centrally between and in parallel relations to the second side of the frame and the opening of the frame.

Advantageously, the presence of at least one aperture, e.g. at least one elongate aperture, enables the frame to be moulded as a unitary article.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DETAILED DESCRIPTION

Figure 1:
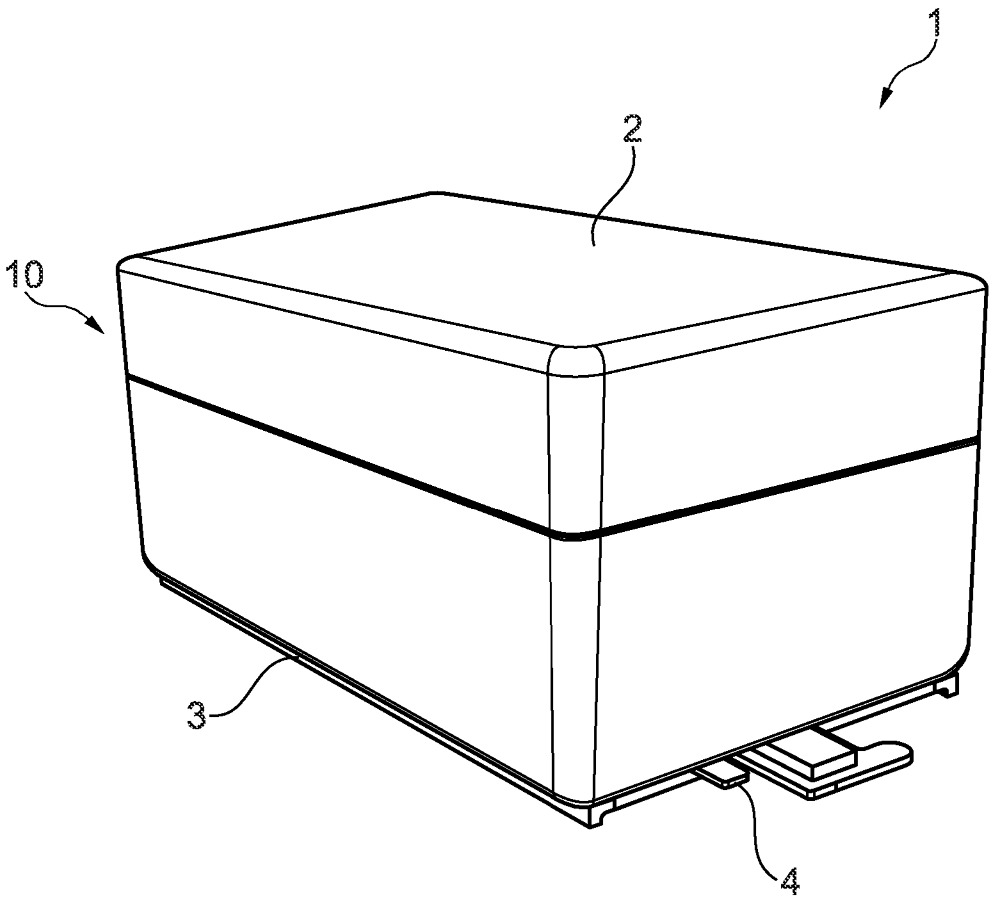
FIG. 1 is a perspective view of an apparatus for securely retaining bank notes according to the invention, the apparatus comprising a cover plate and a frame, and shown in a closed condition.

Referring now to FIG. 1, there is shown an apparatus 1 for securely retaining documents such as bank notes according to an embodiment of the invention. The apparatus 1 comprises a receptacle 10 having a pouch or bag 2 and a frame 3 closed by a cover plate 4. The apparatus is suitable for securely retaining valuable documents such as bank notes.

The pouch 2 may be formed from an at least partially flexible material, such as a plastics material (e.g. polypropylene or other suitable polymer film). The pouch 2 and the frame 3 may be formed from the same plastics material, so that (advantageously) recycling of the receptacle 10 is more readily achieved (e.g. without having to first separate the pouch 2 from the frame 3). The frame 3 and the cover plate 4 may be formed from the same materials. Alternatively, the pouch 2 and frame 3 may be formed from different materials.

Figure 2A:
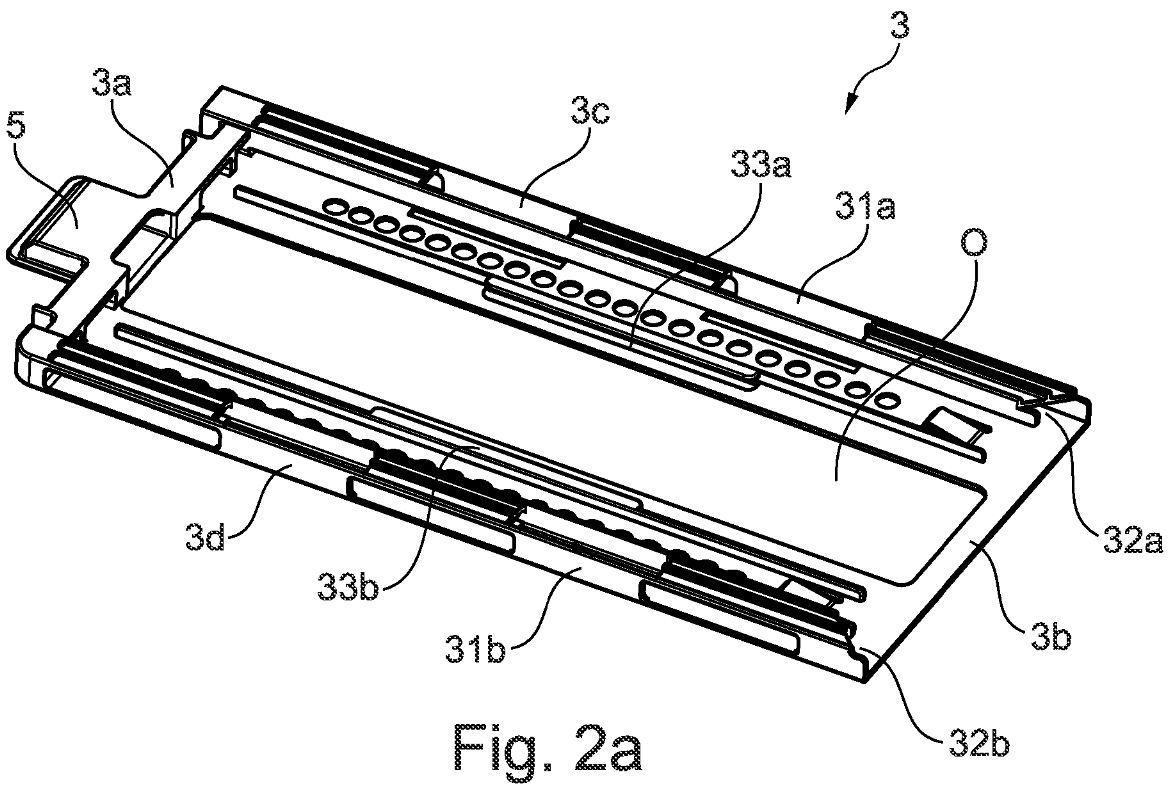
FIG. 2*a* is a perspective view of the frame of the apparatus shown in FIG. 1.
Figure 2B:
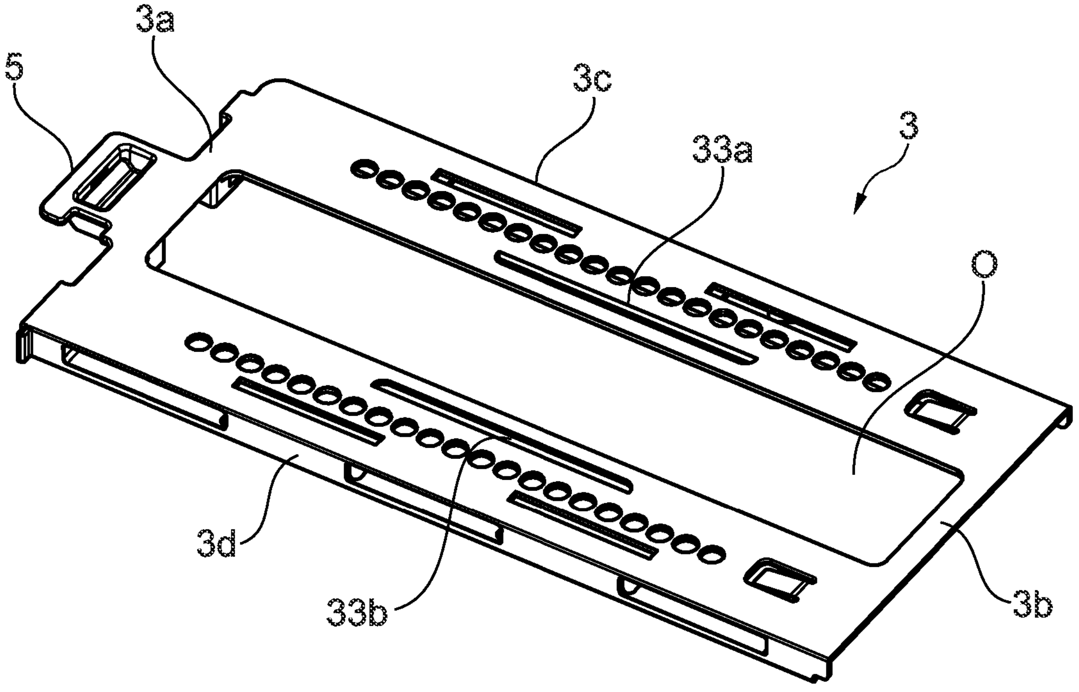
FIG. 2*b* is a reverse perspective view of the frame shown in FIG. 2*a;*

Referring now to FIG. 2*a* and FIG. 2*b*, there is shown a frame 3 of the apparatus 1. FIG. 2*a* shows the outer-facing surface of the frame 3. FIG. 2*b* shows the surface of the frame 3, which faces the interior of the pouch.

The frame 3 comprises a first end 3*a* and a second end 3*b* interconnected by a pair of opposed sides 3*c*, 3*d*. The frame 3 comprises an opening O surrounded by the first end 3*a*, the second end 3*b* and sides 3*c*, 3*d*. The opening O is configured (e.g. sized and shaped) to allow the insertion of bank notes therethrough, in use of the apparatus 1.

The sides 3*c*, 3*d* of the frame 3 each comprise a slot or channel 31*a*, 31*b* for receipt of side edges of the cover plate 4. The channels 31*a*, 31*b* may be of the same Π-shaped form as those shown in EP1503351. Each channel 31*a*, 31*b* has a free end 32*a*, 32*b* to allow the cover plate 4 to be received in the channels 31*a*, 31*b.*

The first end 3*a* of the frame 3 comprises a female member 5, which is further described in FIGS. 6*a* to 6*c* below.

The frame 3 shown in this embodiment is fabricated from rigid plastics material using a moulding technique. The frame 3 may further comprise elongate apertures 33*a*, 33*b* located in parallel to and inboard of the channels 31*a*, 31*b* along the central third of the frame 3. Advantageously, the presence of the elongate apertures 33*a*, 33*b* enables the frame 3 to be moulded as a unitary article.

Preferably, the female member 5 is integrally formed with the first end 3*a* of the frame 3. However, in other embodiments the female member 5 may be separately formed and attachable to the first end 3*a* of the frame 3.

The pouch 2 (shown in FIG. 1) is attached to the periphery of the frame 3 along the first end 3*a*, second end 3*b* and sides 3*c*, 3*d*, prior to use of the apparatus 1, to form the receptacle 10. For example, the pouch 2 may be ultrasonically welded to the periphery of the frame 3 along the first end 3*a*, second end 3*b* and sides 3*c*, 3*d.*

Figure 3A:
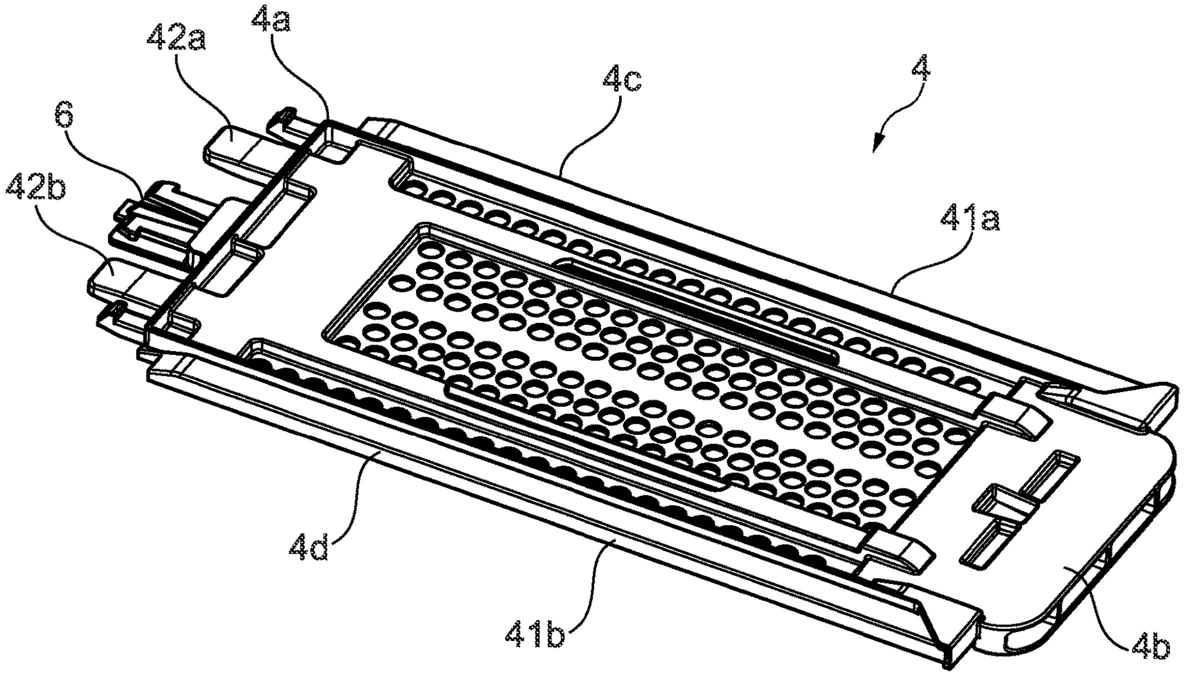
FIG. 3*a* is a perspective view of the cover plate of the apparatus shown in FIG. 1.
Figure 3B:
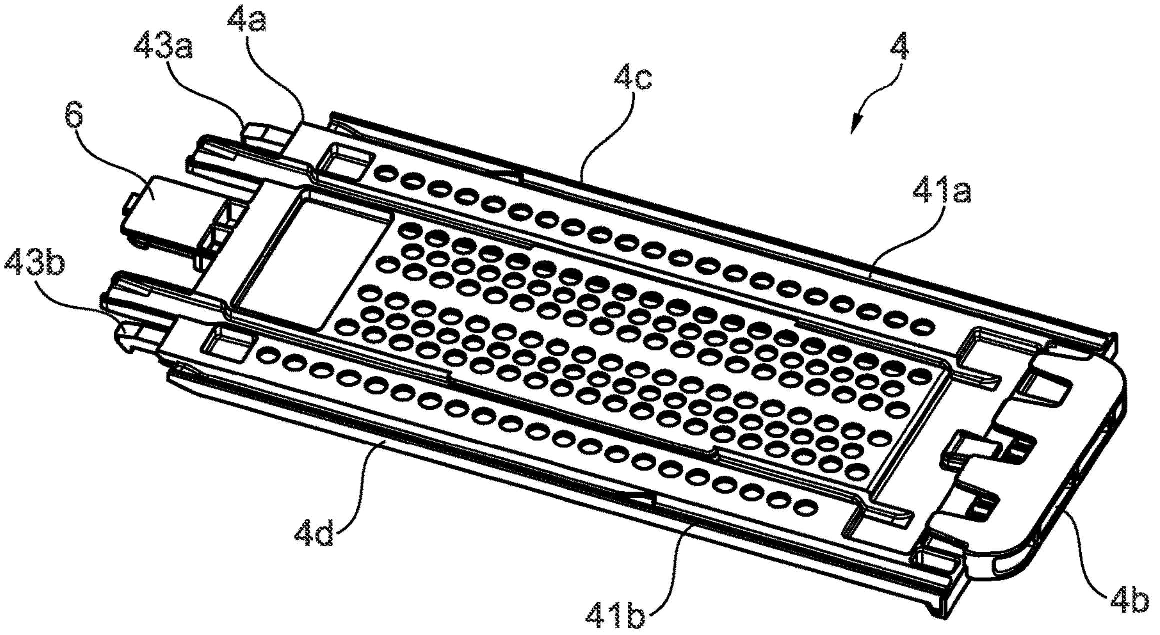
FIG. 3*b* is a reverse perspective view of the cover plate shown in FIG. 3*a;*

Referring now to FIG. 3*a* and FIG. 3*b*, there is shown the cover plate 4 of the apparatus 1. FIG. 3*a* shows the exterior-facing surface of the cover plate 4. FIG. 3*b* shows the surface of the cover plate 4 that faces the interior of the pouch in use.

The cover plate 4 comprises a leading end 4*a*, a trailing end 4*b*, and a pair of side edges 4*c*, 4*d.*

The cover plate 4, which is generally planar, is provided absent openings which might be large enough to allow access therethrough to the contents of the receptacle 10 (when the cover plate 4 is attached thereto).

The side edges 4*c*, 4*d* of the cover plate 4 comprise shaped portions 41*a*, 41*b*. The shaped portions 41*a*, 41*b* are configured to engage (for example, in a sliding manner) in the channels 31*a*, 31*b* in each of the sides 3*c*, 3*d* of the frame 3, when the cover plate 4 is inserted thereinto.

The leading end 4*a* of the cover plate 4 comprises a male member 6. The male member 6, which is further described in FIGS. 5*a* and 5*b* below, extends or projects from the leading end 4*a* of the cover plate 4.

The leading end 4*a* of the cover plate 4 also further comprises a pair of projections 42*a*, 42*b*, and a pair of fasteners 43*a*, 43*b*, each of which is shaped and configured to interlock with a correspondingly shaped recess located in the Applicant's CCi (RTM) device.

The cover plate 4 shown in this embodiment is fabricated from rigid plastics material using a moulding technique. In this embodiment, the male member 6 is integrally formed with the leading end 4*a* of the cover plate 4. However, in other embodiments the male member 6 may be separately formed and attachable to the leading end 4*a* of the cover plate 4.

Figure 4A:
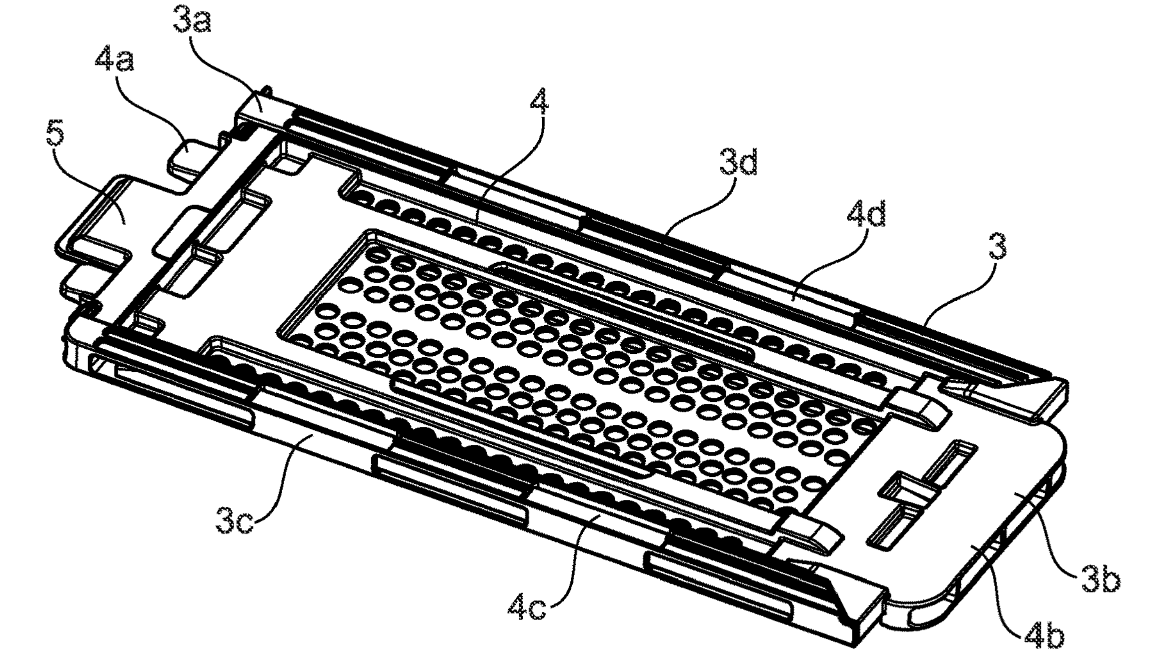
FIG. 4*a* is a perspective view of the apparatus of FIG. 1 in a closed condition, absent the flexible pouch.
Figure 4B:
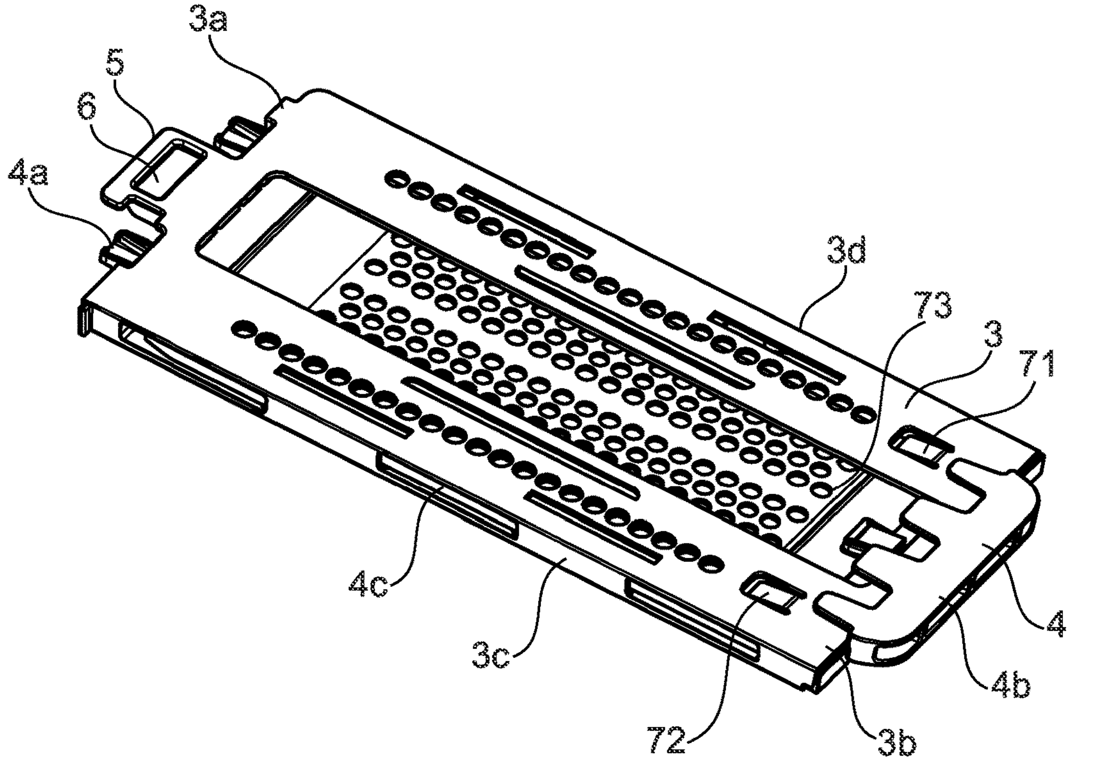
FIG. 4*b* is a reverse perspective view of the apparatus shown in FIG. 4*a;*

Referring also to FIG. 4*a* and FIG. 4*b*, there is shown the frame 3 and the cover plate 4 of the apparatus 1 in combination in a closed condition.

To provide the closed condition, the shaped portions 41*a*, 41*b* of the cover plate 4 are aligned with the free ends 32*a*, 32*b* of the channels 31*a*, 31*b* of the frame 3 in the configuration shown in FIG. 2*a* and FIG. 3*a*. The cover plate 4 is received in a sliding manner into the frame 3.

The male member 6 of the cover plate 4 is received within the female member 5 of the frame 3. The female member 5 of the frame 3 and the male member 6 of the cover plate 4 are shaped and configured to form an irreversible lock when the cover plate 4 and the frame 3 are in the closed condition.

In embodiments, the second end 3*b* of the frame 3 and the trailing end 4*b* of the cover plate 4 optionally each comprise a locking means configured to irreversibly retain the cover plate 4 in the frame 3 when attached thereto. The locking means may comprise a first clip 71 and/or a second clip 72 located between the centre of the frame 3 and the second end 3*b* of the frame 3, and spaced from the sides 3*c*, 3*d* (as shown in FIG. 4*a*). The first clip 71 and the second clip 72 are partially cut-out portions of the frame 3 each comprising a tab, the tabs being are angled towards the first end 3*a* of the frame 3 and point downwardly towards the cover plate 4 in use. Each clip 71, 72 comprises an upstanding tab. The locking means further comprises one or more abutment surfaces located on the cover plate 4 configured to interlock or engage with the first clip 71 and/or the second clip 72 to form a lock (e.g. an irreversible lock) between the frame 3 and the cover plate 4. In this embodiment, the abutment surface of the cover plate 4 comprises an upstanding wall 73, which is configured to engage with the first clip 71 and the second clip 72.

In use, the sides 4*c*, 4*d* of the cover plate 4 are received in a sliding manner into the channels 31*a*, 31*b* of the frame 3. The downwardly pointing portions of the clips 71, 72 are forced upwards to slide over the surface of the cover plate 4 as the sides 4*c*, 4*d* slide further along the channels 31*a*, 31*b*. The first clip 71 and second clip 72 are configured to slide over the upstanding wall 73 of the cover plate 4. In the closed condition, in which the male member 5 is fully received within the female member 6, the upstanding wall 73 of the cover plate 4 is located ahead of the first clip 71 and the second clip 72 and abuts the downwardly pointing portions of the clips 71, 72 in a ratchet-like manner. Consequently, removal of the cover plate 4 is prevented because the clips 71, 72 cannot upwardly flex to overcome the upstanding wall 73 to allow sliding of the cover plate 4 in a reverse direction. Advantageously, the clips 71, 72 are angled downwardly towards the cover plate 4 when the cover plate 4 and the frame 3 are coupled such that the clips 71, 72 are covered and are therefore inaccessible when the apparatus is sealed. This mitigates tampering of the clips 71, 72 in an attempt to remove the cover plate 4 to open the apparatus.

Figure 5A:
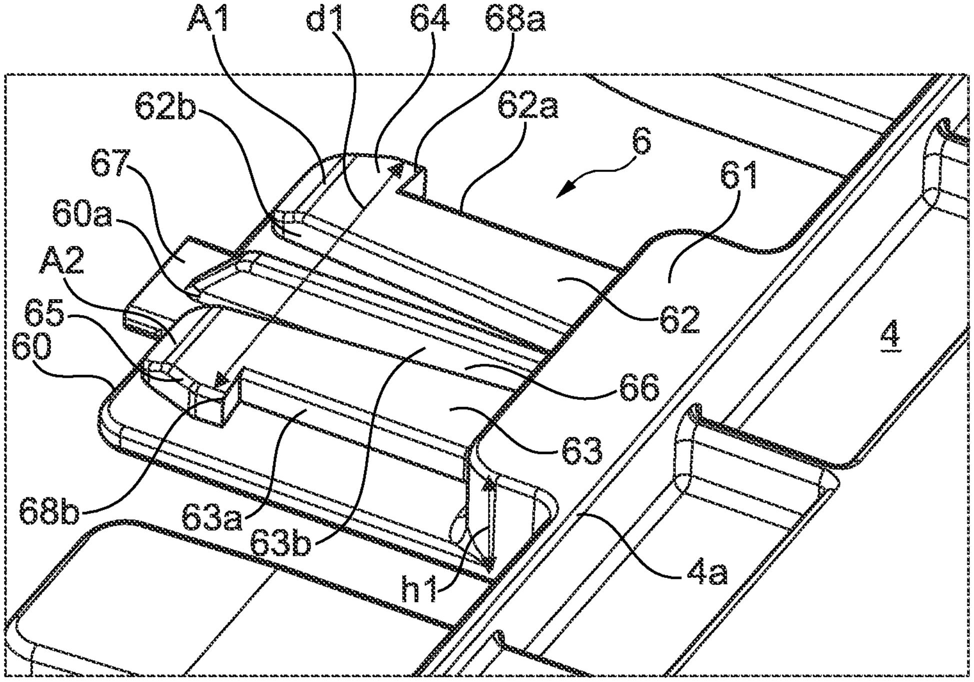
FIG. 5*a* is a close-up view of the male member of the cover plate of FIG. 3*a;*
Figure 5B:
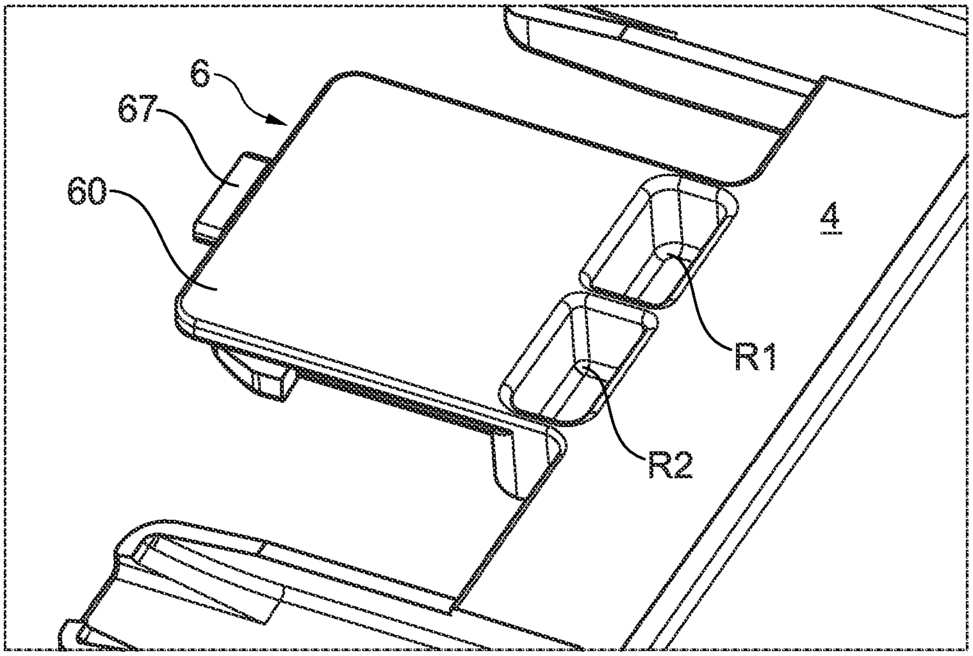
FIG. 5*b* is a reverse close-up view of the male member of FIG. 5*a;*

Referring now to FIG. 5*a* and FIG. 5*b*, there is shown the male member 6 of the cover plate 4 in more detail.

The male member 6 projects from the leading end 4*a* of the cover plate 4.

The male member 6 comprises a base portion 60, a platform 61, a first elongate flexible arm 62 and a second elongate flexible arm 63. The platform 61 is secured to the leading end 4*a* of the cover plate 4 such that the platform 61 extends from the leading end 4*a* of the cover plate 4. The platform 61 has a height h1. As shown in FIG. 5*b*, the platform 61 comprises two hollow recesses R1 and R2 on the interior pouch-facing surface of the cover plate 4.

The first elongate flexible arm 62 and the second elongate flexible arm 63 each extend from the leading end 4*a* of the cover plate 4 via the platform 61 of the male member 6 and each have a free distal end A1, A2. The first elongate flexible arm 62 and the second elongate flexible arm 63 are spaced from, and are not secured to, the base portion 60 of the male member 6.

The first elongate flexible arm 62 comprises a stem having an outer edge 62*a* and an inner edge 62*b*. The second elongate flexible arm 63 also comprises a stem having an outer edge 63*a* and an inner edge 63*b*.

The outer edge 62*a*, 63*a* of each elongate flexible arm 62, 63 comprises a laterally extending portion 64, 65 respectively, each located at or towards the free distal end.

Each laterally extending portion 64, 65 extends perpendicularly and outwardly from the respective outer edge 62*a*, 63*a* of the respective elongate flexible arm 62, 63 to form an abutment surface 68*a*, 68*b* before tapering in towards the free distal end A1, A2 of the respective elongate flexible arm 62, 63 to form a ramped portion. The free distal end A1, A2 of each laterally extending portion 64, 65 is flat and parallel to the leading end 4*a* of the cover plate 4. As such, each laterally extending portion 64, 65 forms a truncated triangle shape.

Figure 6A:
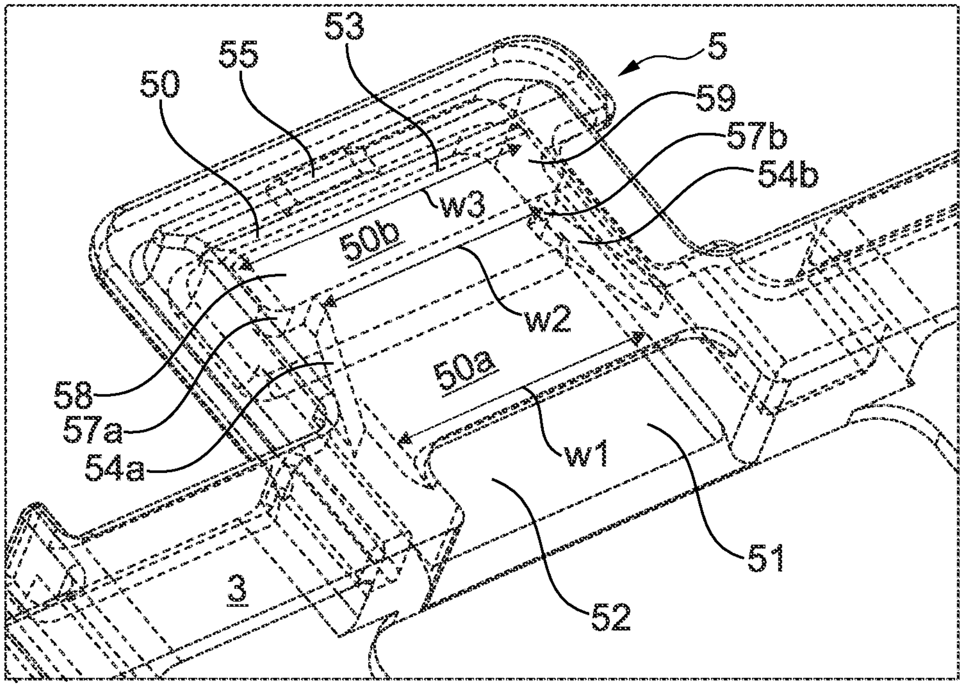
FIG. 6*a* is a transparent close-up view of the female member of the frame shown in FIG. 2*a;*

The laterally extending portions 64, 65 each provide an abutment surface 68*a*, 68*b* to engage with a corresponding surface within the cavity of the female member 5 shown in FIG. 6*a*.

The dimension formed between the widest point of the laterally extending portions 64, 65 of the first and second elongate flexible arm 62, 63 is labelled d1. This dimension represents the nascent or resting position of the first and second elongate flexible arm 62, 63 in the male member 6.

In this embodiment, the first elongate flexible arm 62 and the second elongate flexible arm 63 are mirror images of one another such that the male member 6 is provided with a pair of elongate flexible arms. However, in alternative embodiments, the first elongate flexible arm 62 and the second elongate flexible arm 63 may have different shapes to one another.

The inner edge 62*b*, 63*b* is substantially flat and does not comprise any projections.

In this embodiment, the male member 6 comprises a central rib 66. The central rib 66 is located centrally between the first projection 61 and the second projection 62. In contrast to the first elongate flexible arm 62 and the second elongate flexible arm 63, the central rib 66 is secured to the central portion 60*a* of the base portion 60 of the male member 6.

The central portion 60*a* of the base portion 60 of the male member 6 further comprises a protrusion 67 extending outwardly from and in the same plane as the base portion 60.

The first elongate flexible arm 62 and the second elongate flexible arm 63 are formed from a flexible material, e.g. a plastics material.

Figure 6B:
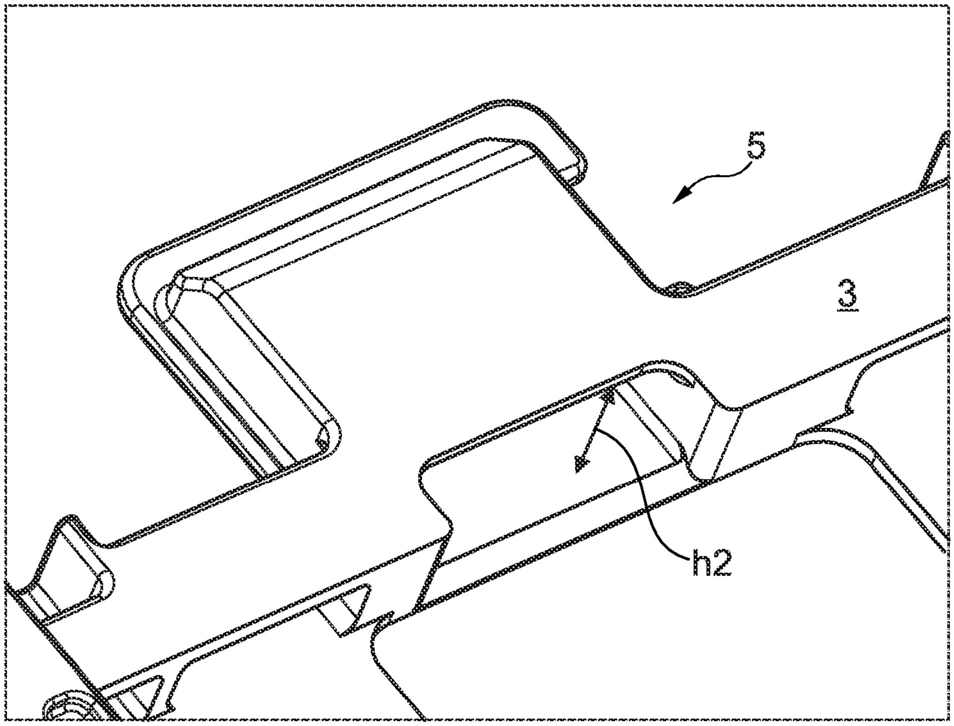
FIG. 6*b* is an opaque close-up view of the female member of the frame of FIG. 6*a;*
Figure 6C:
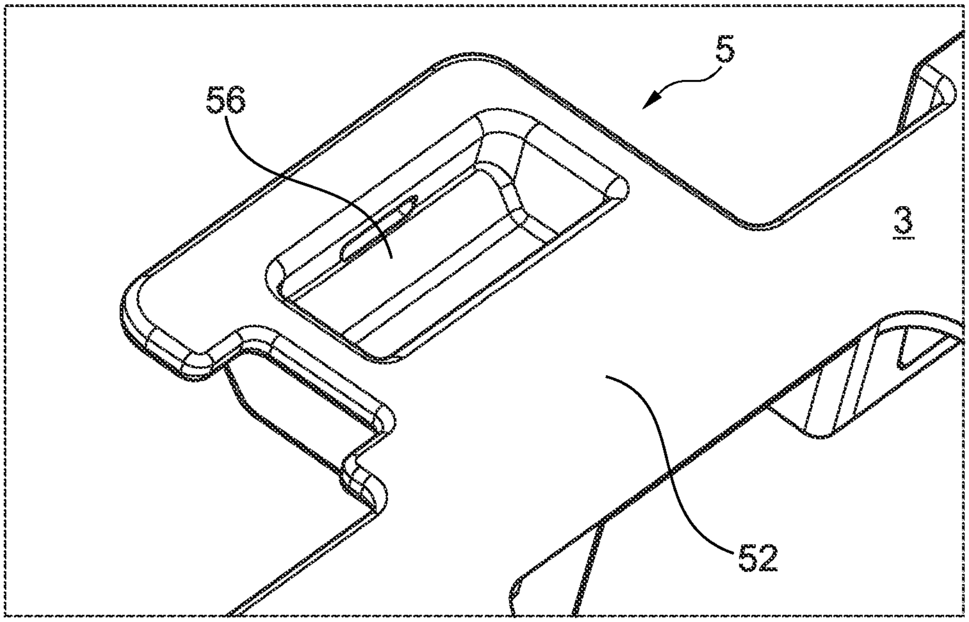
FIG. 6*c* is a reverse close-up view of the female member of the frame of FIG. 6*a;*

Referring now to FIG. 6*a*, FIG. 6*b*, and FIG. 6*c*, there is shown the female member 5 of the frame 3 in more detail. In FIG. 6*a*, the female member 5 is transparent to show the internal features.

The female member 5 projects from the leading, or first, end 3*a* of the frame 3.

The female member 5 comprises a cavity 50 having an opening 51. The cavity 50 has a base portion 52, a top portion 53, and two opposing walls 54*a*, 54*b*. The cavity 50 is shaped to accommodate the male member 6 to form an irreversible lock when the cover plate 4 and the frame 3 are in the closed condition.

The opposing walls 54*a*, 54*b* of the cavity 50 define a first area 50*a* and a second area 50*b*. The first area 50*a* is located adjacent the opening 51 of the cavity 50, and the second area 50*b* is located at the innermost end of the cavity 50.

In the first area 50*a* of the cavity 50, the initial internal width w1 between the opposing walls 54*a*, 54*b* of the first area 50*a* of the cavity 50 is widest adjacent the opening 51 of the cavity 50. The internal width between the opposing walls 54*a*, 54*b* of the first area 50*a* of the cavity 50 then gradually narrows to an internal width w2 as the first area 50*a* extends towards the second area 50*b* at the innermost end of the cavity 50. The narrowing of the opposing walls 54*a*, 54*b* creates a ramped portion on either side of the cavity 50. The opposing walls 54*a*, 54*b* then immediately widen to a final width w3 in the second area 50*b* of the cavity 50. The final width w3 is substantially the same as the initial internal width w1 of the first area 50*a*.

The opposing walls 54*a*, 54*b* in the second area 50*b* of the cavity 50 provides retaining surfaces 57*a*, 57*b* which cooperate with and engage with the abutment surfaces 68*a*, 68*b* provided by the laterally extending portions 64, 65 of the male member 5. The second area 50*b* comprises correspondingly shaped recesses 58, 59 to the laterally extending portions 64, 65 to house or accommodate these when the irreversible lock is in a closed condition.

The cavity 50 also comprises a recessed portion 55 located at the innermost end of the cavity 50. The recessed portion 55 is shaped to accommodate the protrusion 67 extending from the base portion 60 of the male member 6 of the cover plate 4.

As shown in FIG. 6*b*, the cavity 50 has a substantially uniform height h2. The height h2 of the cavity 50 is less than the height h1 of the platform 61 of the male member 6 of the cover plate 4.

As is best shown in FIG. 6*c*, the base portion 52 of the cavity 50 comprises an aperture 56 on the interior-facing surface of the frame 3.

Figure 7:
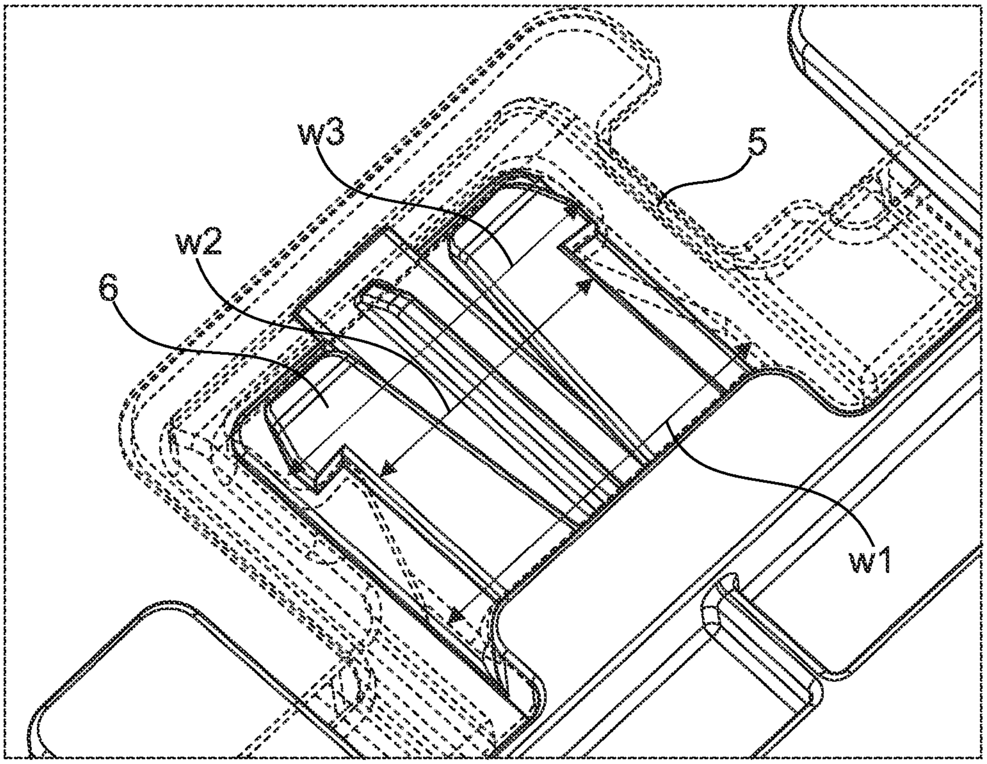
FIG. 7 is a transparent perspective view of the female member of FIG. 6*a* and the male member of FIG. 5*a* shown in a closed condition.

Referring now to FIG. 7, there is shown the male member 6 located within the cavity 50 of the female member 5 to form an irreversible lock.

The initial internal width w1 and the final width w3 between the opposing walls 54*a*, 54*b* of the female member 5 is slightly larger than the dimension d1 formed between the widest point of the laterally extending portions 64, 65 of the first and second elongate flexible arm 62, 63 of the male member 6. The internal width w2 between the opposing walls 54*a*, 54*b* of the female member 5 is smaller than the nascent dimension d1 formed between the widest point of the laterally extending portions 64, 65 of the first and second elongate flexible arm 62, 63.

In use of the apparatus 1, and with the frame 3 retained in a document receiving device, such as the Applicant's CCi (RTM) device, bank notes or other documents are inserted through the opening O in the frame 3 and are retained within the pouch 2. When the pouch 2 is full or it is determined that the receptacle 10 (comprising the frame 3 and pouch 2) should otherwise be closed (for example to allow for secure transport of the bank notes) the cover plate 4 is secured to the frame 3 of the receptacle 10. The sides 4*c*, 4*d* of the cover plate 4 are slidably received into the slots or channels in the sides 3*c*, 3*d* of the frame 3 until the leading end 4*a* of the cover plate 4 is adjacent the first end 3*a* of the frame 3.

The male member 6 of the cover plate 4 is inserted and is received in a sliding manner into the cavity 50 of the female member 5 of the frame 3.

As the male member 6 is pushed further into the cavity 50, the laterally extending portions 64, 65 of the first and second elongate flexible arm 62, 63 contact the opposing walls 54*a*, 54*b* of the cavity 50. In the first area 50*a*, the narrowing of the opposing walls 54*a*, 54*b* forms a ramp which causes the first elongate flexible arm 62 and the second elongate flexible arm 63 to resiliently flex inwardly such that these are compressed and forced together, and the internal surfaces 62*a*, 62*b* are forced towards one another. This decreases the dimension d1 between the laterally extending elongate flexible arm 64, 65 of the first and second elongate flexible arm 62, 63 from its nascent or resting position, to a stressed intermediate position. As the laterally extending portions 64, 65 of the first and second elongate flexible arm 62, 63 are pushed further into the cavity 50 and enter the second area 50*b*, the force causing the elongate flexible arm 62, 63 to be compressed towards one another is released because the final width w3 between the opposing walls 54*a*, 54*b* of the second area 50*b* of the cavity 50 is larger than dimension d1. This allows the first and second elongate flexible arm 62, 63 to expand outwardly and return to the nascent resting position. The abutment surfaces 68*a*, 68*b* provided by the laterally extending portions 64, 65 are engaged with the retaining surfaces 57*a*, 57*b* provided by the second area 50*b* of the cavity 50.

Since the cavity 50 of the female member 5 is closed with no apertures, there are no means available when the irreversible lock is in a closed condition to actuate the pair of elongate flexible arms 62, 63 to force these to inwardly flex towards one another to reduce the dimension d1. Therefore, the male member 6 cannot be removed from the female member 5 without causing significant damage or breakage, which would indicate tampering of the apparatus to the owner.

Advantageously, the irreversible lock formed between the female member 5 and the male member 6 improves the security in comparison to locks of the prior art by providing a more effective locking means, and reduces insertion forces, as will be explained.

In said closed condition, the top portion 53 of the cavity 50 of the female member 5 abuts the platform 61 such that the platform 61 does not enter the cavity 50. This prevents excess force from being applied to the male member 6 as it is inserted into the cavity 50 of the female member 51, which prevents breakage of the first and second elongate flexible arm 62, 63 against walls of the cavity 50.

In addition, the protrusion 67 of the male member 6 engages with the recessed portion 55 of the female member 5 to prevent lateral movement of the male member 6 within the female member 5.

Advantageously, the central rib 66 provides additional security by preventing vertical movement within the irreversible lock. The central rib 66 is configured to contact the top portion 53 of the cavity 50 such that an attempt to vertically flex the male member 6 within the female member 5 is mitigated.

Figure 8A:
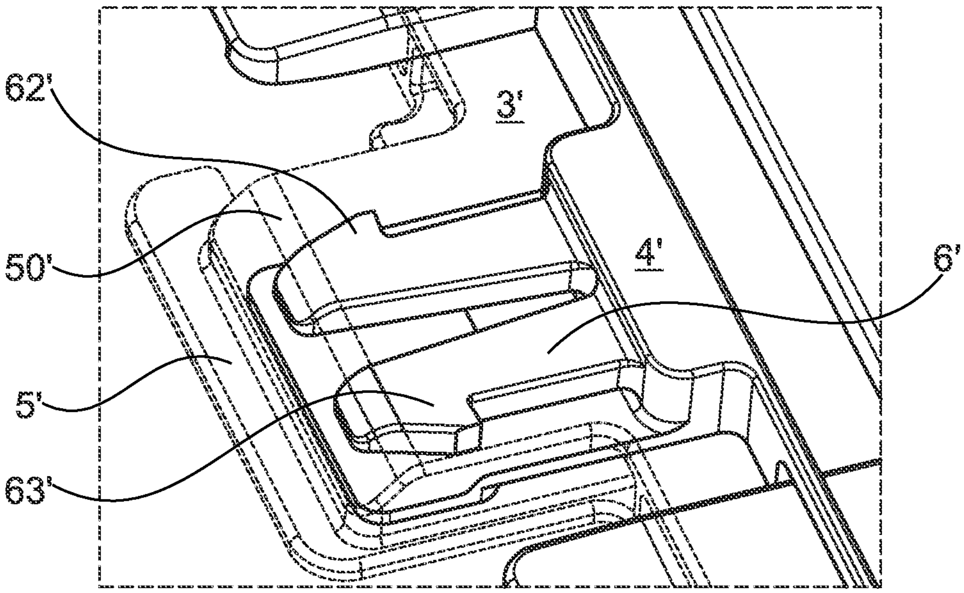
FIG. 8*a* is a transparent perspective view of the female member and the male member of the apparatus according to a second embodiment of the invention.
Figure 8B:
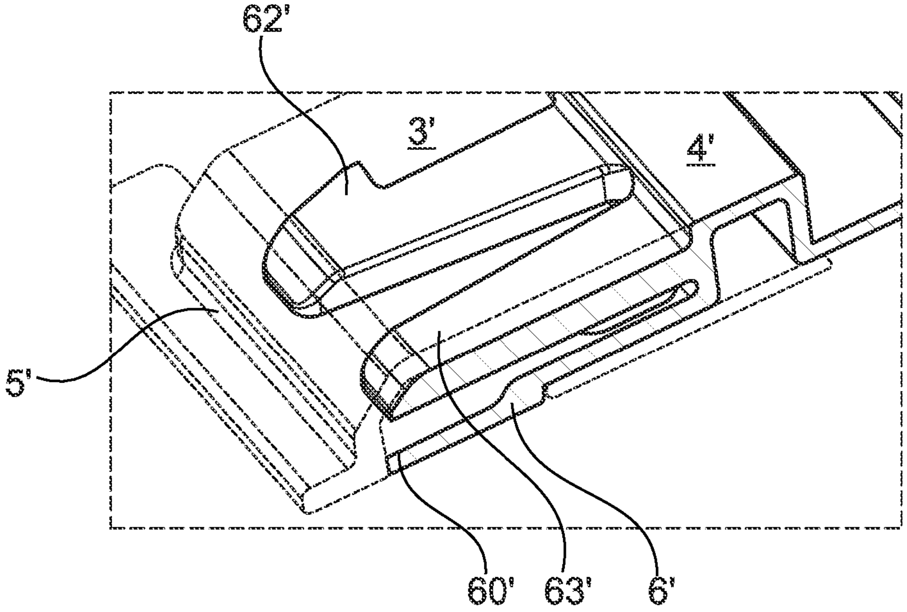
FIG. 8*b* is a transparent perspective view of the female member and male member according to FIG. 8*a* with a cut-away portion.
Figure 9A:
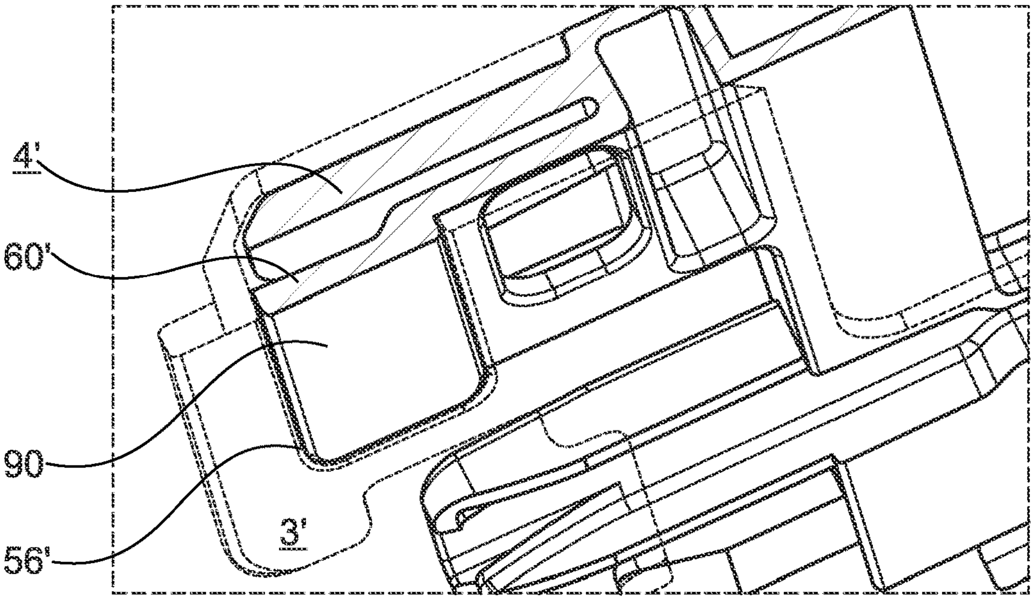
FIG. 9*a* is a transparent perspective view of the female member and the male member of the apparatus of FIG. 8*a;*
Figure 9B:
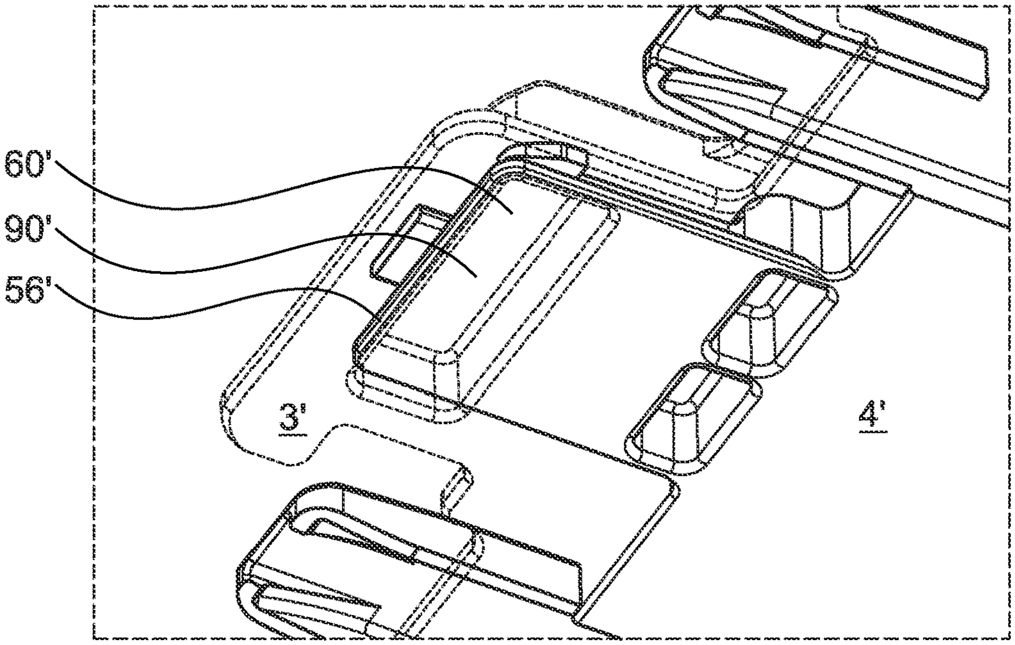
FIG. 9*b* is a transparent perspective view of the female member and the male member of the apparatus according to FIG. 8*a;*
Figure 9C:
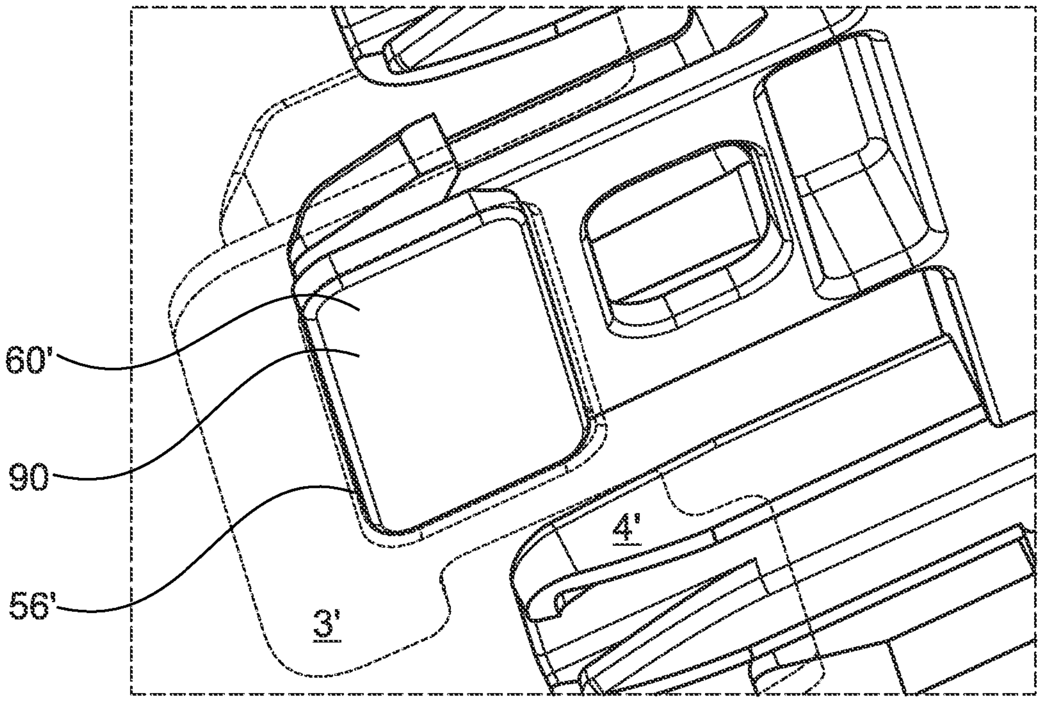
FIG. 9*c* is a transparent perspective view of the female member and the male member of the apparatus according to FIG. 8*a;*
Figure 9D:
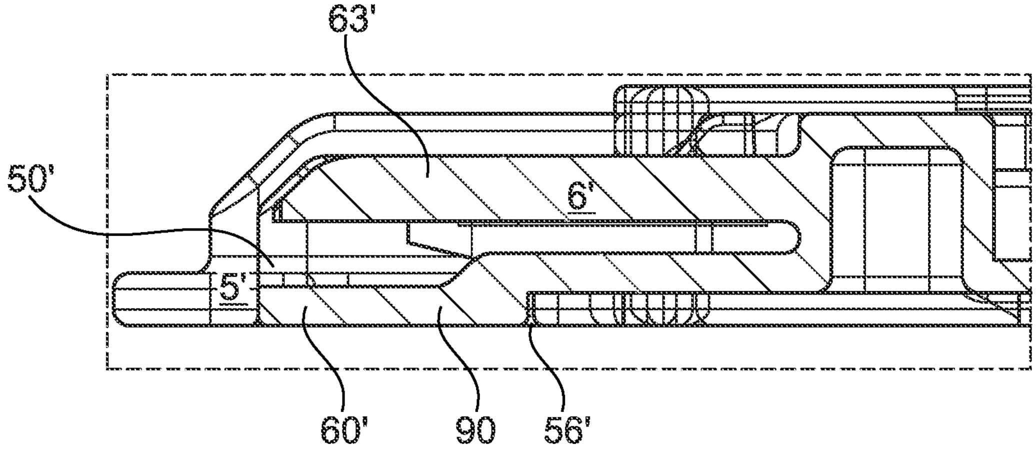
FIG. 9*d* is a side view of the apparatus of FIG. 9*a;*

Referring now to FIGS. 8*a* to 8*c* there is shown a male member 6' of a cover plate 4' located within a cavity 50' of a female member 5' to form an irreversible lock, according to a second embodiment of the invention. The male member 6' extends from the leading end of the cover plate 4'.

The apparatus functions in a similar manner to that described for the first embodiment of the invention shown in FIG. 7.

In this embodiment, the central rib 66 shown in FIG. 5*a* is absent.

Referring now to FIGS. 9*a* to 9*d*, there is shown different perspectives of the apparatus of FIGS. 8*a* to 8*c*.

In this embodiment, the base portion 60' of the male member 6' comprises a lower portion 90 that extends below the plane of the base portion 60' on the interior pouch-facing surface. The lower portion 90 is shaped to be seated within an aperture 56' located within the base portion 52' of the cavity 50'.

In use, the male member 6' is inserted into the female member 5'. The lower portion 90 is able to flex upwardly to slide over the interior of the base portion 52' of the cavity 50'. When the male member 6' is fully inserted into the female member 5', the lower portion 90 configured to engage with the aperture 56' in a non-flexed resting position.

Advantageously, the provision of the lower portion 90 positioned within the aperture 56' of the base portion 52' of the cavity 50' when the apparatus is in the closed condition additionally prevents removal of the male member 6' from the female member 5' by providing an additional irreversible locking means. Moreover, the lower portion 90 covers the other locking features, e.g. a first elongate flexible arm 62' and a second elongate flexible arm 63' which each extend from the leading end of the cover plate 4', such that the first elongate flexible arm 62' and the second elongate flexible arm 63' cannot be accessed or tampered with.

Figure 10:
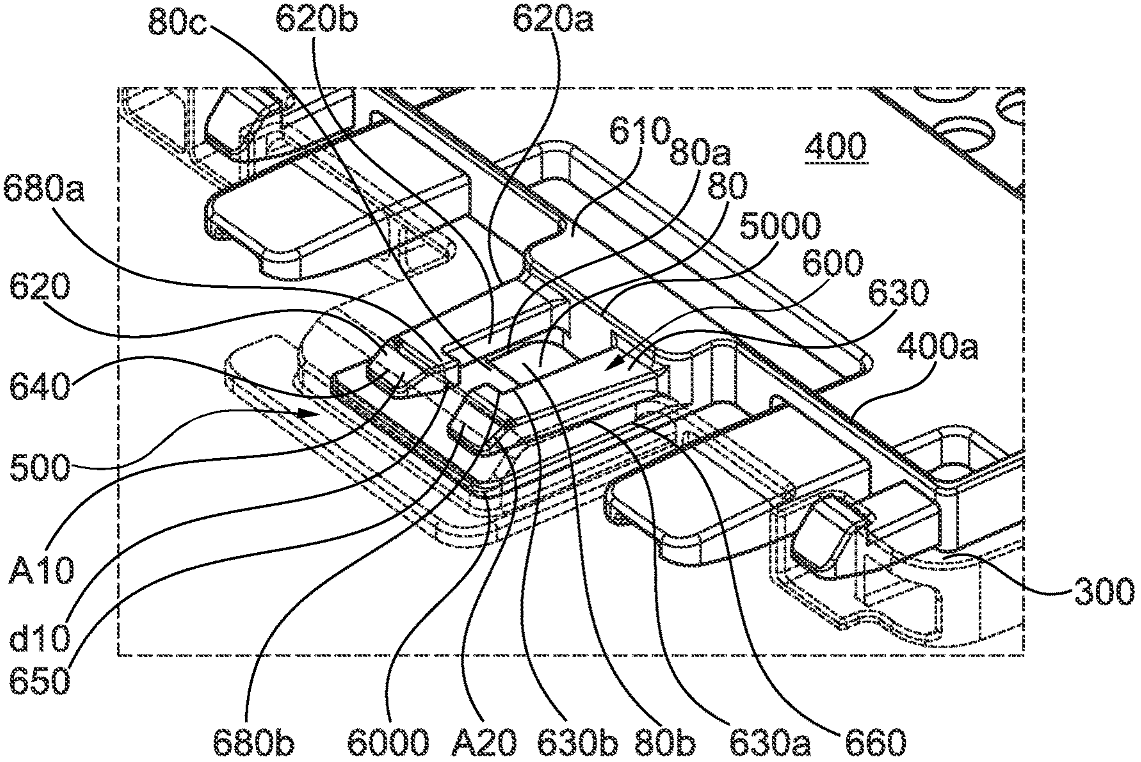
FIG. 10 is a transparent perspective view of a female member and the male member shown in a closed condition according to a third embodiment of the invention.

Referring now to FIG. 10, there is shown a transparent perspective view of a female member 500 and the male member 600 shown in a closed condition according to a third embodiment of the invention. This embodiment has similar features to those described for FIGS. 5*a* to 7 in the first embodiment of the invention, the only difference being the shape of the elongate flexible arms of the male member and the corresponding shaped female member.

The male member 600 projects from a leading edge or end 400*a* of a cover plate 400. The male member 600 comprises a base portion 6000, a platform 610, a first elongate flexible arm 620 and a second elongate flexible arm 630. The platform 610 is secured to the leading end 400*a* of the cover plate 400.

The first elongate flexible arm 620 and the second elongate flexible arm 630 each extend from the leading end or edge 400*a* of the cover plate 400 via the platform 610 of the male member 600 and each have a free distal end A10, A20. The first elongate flexible arm 620 and the second elongate flexible arm 630 are spaced from, and are not secured to, the base portion 6000 of the male member 600.

The first elongate flexible arm 620 comprises a stem having an outer edge 620*a* and an inner edge 620*b*. The second elongate flexible arm 630 also comprises a stem having an outer edge 630*a* and an inner edge 630*b*.

In this embodiment, the inner edge 620*b*, 630*b* of each elongate flexible arm 620, 630 comprises a laterally extending portion 640, 650 respectively, each located at or towards the free distal end.

Each laterally extending portion 640, 650 extends perpendicularly and outwardly towards one another from the respective inner edge 620*b*, 630*b* of the respective elongate flexible arm 620, 630 to form an abutment surface 680*a*, 680*b* before tapering in towards the free distal end A10, A20 of the respective elongate flexible arm 620, 630 to form a ramped portion. The free distal end A10, A20 of each laterally extending portion 640, 650 is flat and parallel to the leading end 400*a* of the frame 400. As such, each laterally extending portion 640, 650 forms a truncated triangle shape.

The laterally extending portions 640, 650 each provide an abutment surface 680*a*, 680*b* to engage with a corresponding surface within the cavity of the female member 500.

The dimension formed between the widest point of the laterally extending portions 640, 650 of the first and second elongate flexible arm 620, 630 is labelled d10. This dimension represents the nascent or resting position of the first and second elongate flexible arm 620, 630 in the male member 600.

In this embodiment, the first elongate flexible arm 620 and the second elongate flexible arm 630 are mirror images of one another such that the male member 600 is provided with a pair of elongate flexible arms.

The outer edge 620*a*, 630*a* is substantially flat and does not comprise any projections.

The first elongate flexible arm 620 and the second elongate flexible arm 630 are formed from a flexible material, e.g. a plastics material.

The female member 500 projects from the leading, or first, end 300*a* of the frame 300.

The female member 500 comprises a cavity 5000 having an opening 510. The cavity 5000 has a base portion 520, a top portion 530, and two opposing walls 540*a*, 540*b*. The cavity 5000 is shaped to accommodate the male member 600 to form an irreversible lock when the cover plate 400 and the frame 300 are in the closed condition.

In this embodiment, the cavity 5000 of the female member 500 also comprises a central raised portion 80. The central raised portion 80 is triangular in plan view, comprising symmetrically ramped outer side walls 80*a*, 80*b* and a top wall 80*c*. The top wall 80*c* provides a retaining surface which cooperate with and engage with the abutment surfaces 680*a*, 680*b* provided by the laterally extending portions 640, 650 of the male member 500 to form an irreversible lock is in a closed condition.

In use, the male member 600 of the cover plate 400 is inserted and is received in a sliding manner into the cavity 5000 of the female member 500 of the frame 300.

As the male member 6 is pushed further into the cavity 50, the laterally extending portions 640, 650 of the first and second elongate flexible arm 620, 630 each contact a symmetrically ramped outer side wall 80*a*, 80*b* of the central raised portion 80 of the female member 500. The outer side walls 80*a*, 80*b* force the first and second elongate flexible arms 620, 630 to flex in the direction of the plane of the cover plate 400 and the frame 300.

The internal surfaces 620*a*, 620*b* of the first and second elongate flexible arms 620, 630 are forced towards one another. This increases the dimension d10 between the laterally extending portions 640, 650 of the first and second elongate flexible arm 620, 630 from its nascent or resting position, to a stressed intermediate position. As the laterally extending portions 640, 650 of the first and second elongate flexible arm 620, 630 are pushed further into the cavity 5000 to reach the top wall 80*c* of the central raised portion 80, the force causing the elongate flexible arms 620, 630 to be pushed away from one another is released. This allows the first and second elongate flexible arm 620, 630 to contract inwardly and return to the nascent resting position. The abutment surfaces 680*a*, 680*b* provided by the laterally extending elongate flexible arm 640, 650 are engaged with the top wall 80*c* of the central raised portion 80, which provides a retaining surface.

Since the cavity 5000 of the female member 500 is closed with no apertures, there are no means available when the irreversible lock is in a closed condition to actuate the pair of elongate flexible arms 620, 630 to force these to outwardly flex away from one another to increase the dimension d10. Therefore, the male member 600 cannot be removed from the female member 500 without causing significant damage or breakage, which would indicate tampering of the apparatus to the owner.

In this embodiment, the male member 600 further comprises a rib 660. The rib 660 is located on a side of the base portion 6000 of the male member. In contrast to the first elongate flexible arm 620 and the second elongate flexible arm 630, the rib 660 is secured to the base portion 6000 of the male member 600. Advantageously, the rib 660 extends to contact the top surface of the cavity 5000 of the female member 500 to provide additional stability to the irreversible lock.

Figure 11:
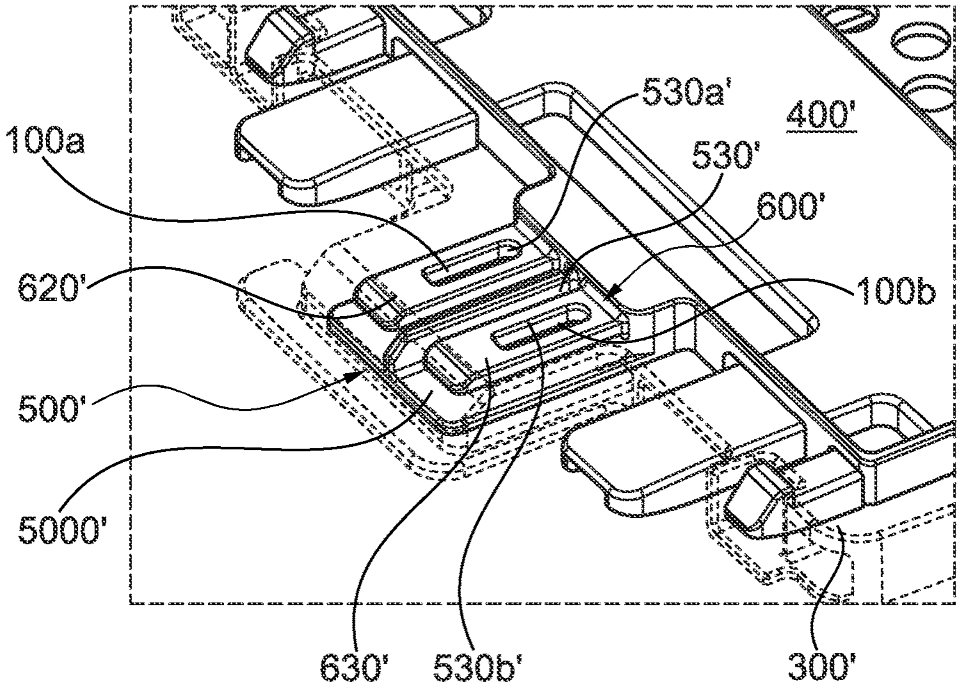
FIG. 11 is a transparent perspective view of a female member and the male member shown in a closed condition according to a fourth embodiment of the invention.

Referring now to FIG. 11, there is shown a transparent perspective view of a female member 500' and the male member 600' shown in a closed condition according to a fourth embodiment of the invention.

In this embodiment, the male member 600' comprises a first elongate flexible arm 620' and a second elongate flexible arm 630', wherein the elongate flexible arms 620', 630' are configured to flex in the direction transverse to the plane of the cover plate 400' and frame 300' when inserted into the female member 500'.

The first and second elongate flexible arms 620', 630' each comprise an aperture 100*a*, 100*b* therethrough. In this embodiment, the aperture 100*a*, 100*b* is centrally located on each of the first and second elongate flexible arms 620', 630'. However, in alternative embodiments the aperture need not be centrally located.

As described in relation to the previous embodiments of the invention, each of the first elongate flexible arm 620' and the second elongate flexible arm 630' extends or projects from a leading end of the cover plate 400'.

The top portion 530' of the cavity 5000' of the female member 500' comprises correspondingly shaped projections 530*a'*, 530*b'*, which are configured to cause the first and second elongate flexible arms 620', 630' to flex in the direction transverse to the plane of the cover plate 400' and frame 300' when partially inserted into the female member 500', and form an irreversible lock when the male member 600' is fully inserted into the female member 500' in a closed condition.

Figure 12:
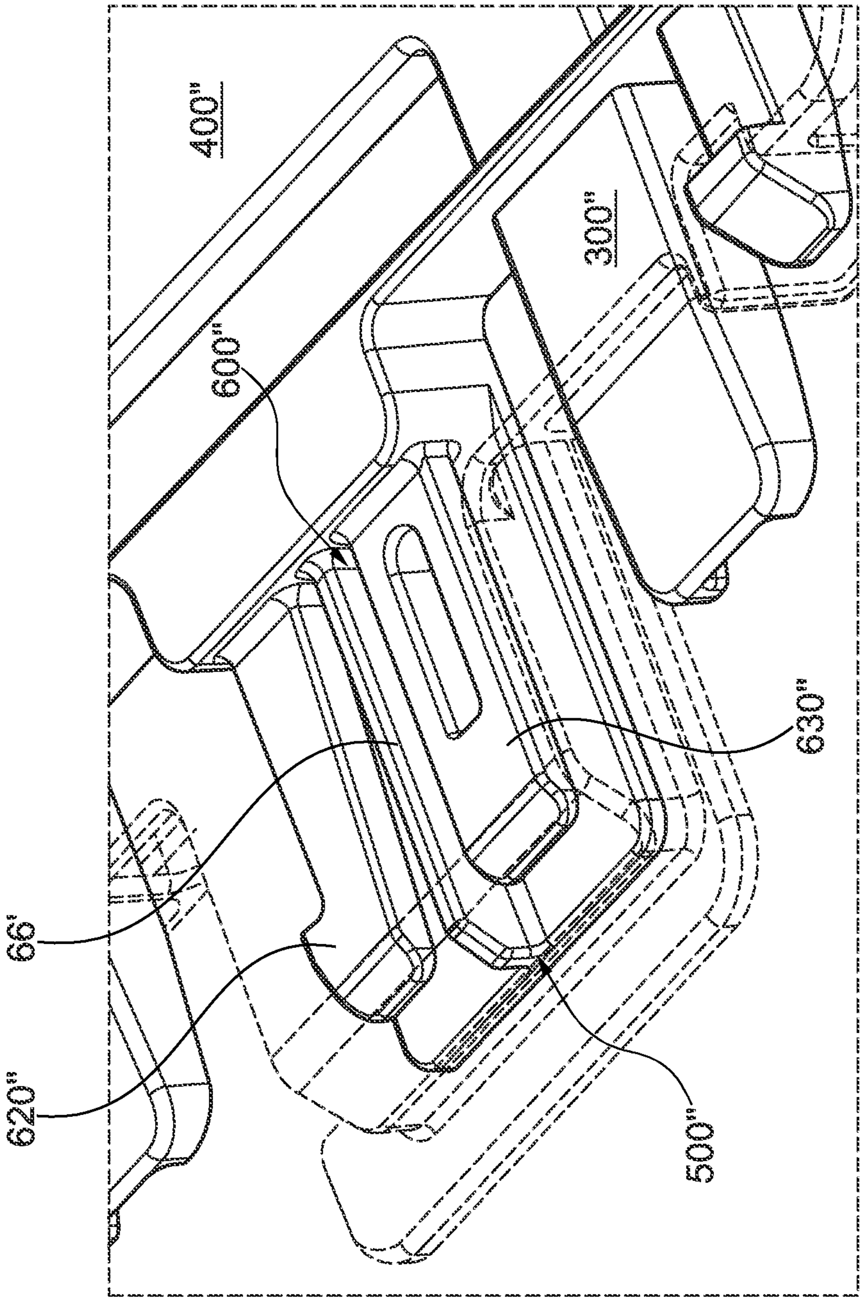
FIG. 12 is a transparent perspective view of a female member and the male member shown in a closed condition according to a fifth embodiment of the invention.

Referring now to FIG. 12, there is shown a transparent perspective view of a female member 500" and the male member 600" shown in a closed condition according to a fifth embodiment of the invention.

The irreversible lock according to this embodiment comprises a first elongate flexible arm 620" as shown in FIG. 10, and a second elongate flexible arm 630" as shown in FIG. 11 and function in a similar manner. Each of the first elongate flexible arm 620" and the second elongate flexible arm 630" extends or projects from a leading end of the cover plate 400".

Therefore, in this embodiment, the first elongate flexible arms 620" is configured to flex in the direction of the plane of the cover plate 400' and frame 300" when inserted into the female member 500", and the second elongate flexible arm 630" is configured to flex in the direction transverse to the plane of the cover plate 400" and frame 300" when inserted into the female member 500".

The irreversible lock of this embodiment also further comprises a central rib 66' which performs the same function as has been described for the embodiment shown in FIG. 5*a*.

Figure 13A:
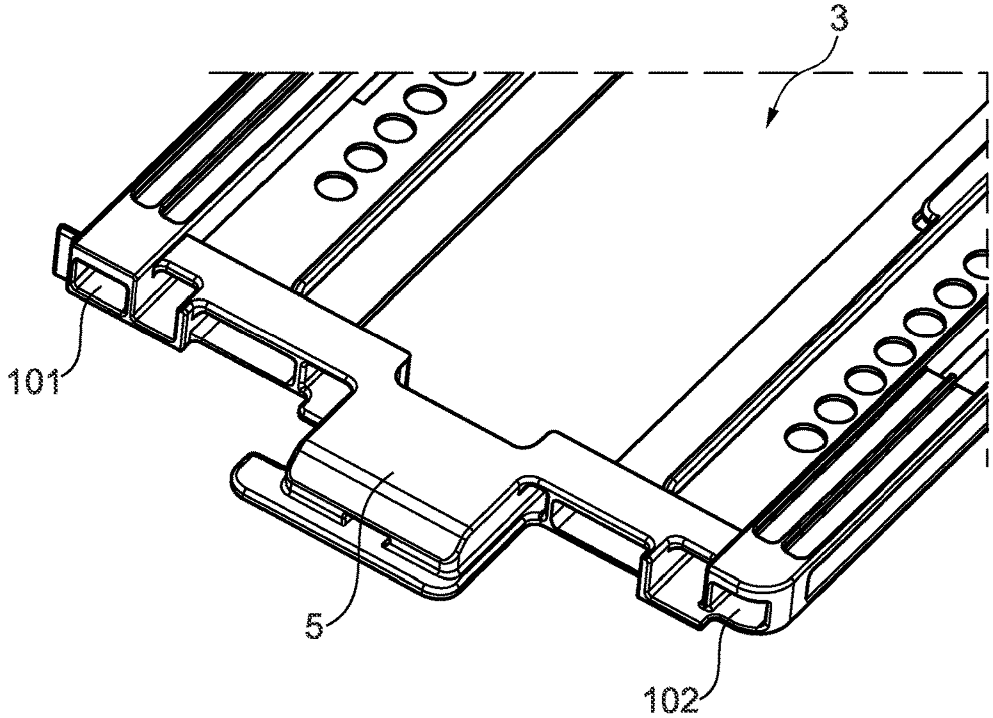
FIG. 13*a* is a perspective view of the first end of the frame of FIG. 2*a;*
Figure 13B:
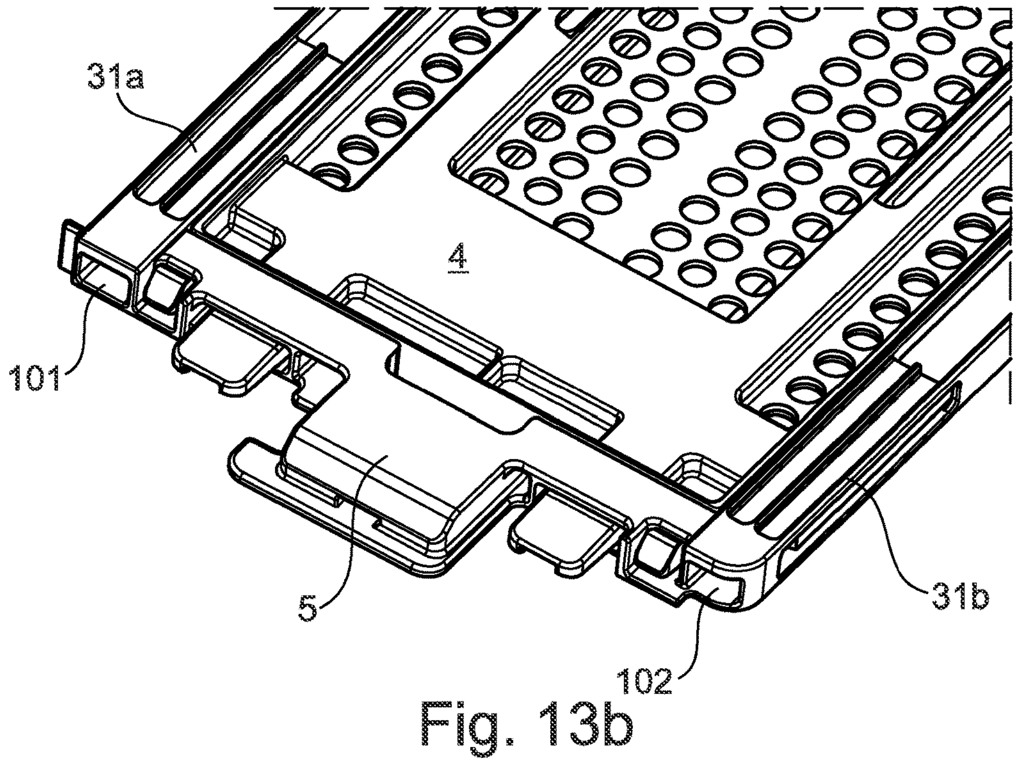
FIG. 13*b* is a perspective view of the first end of the frame of FIG. 13*a* in combination with the cover plate of FIG. 3*a.*

Referring now to FIG. 13*a*, there is shown the first end 3*a* of the frame 3 of FIG. 2*a*. Referring also to FIG. 13*b*, there is shown the frame 3 and the cover plate 4 in a closed configuration.

The first end of the frame 3 comprises a first recess 101 and a second recess 102 located at the end of the channels 31*a*, 31*b*. In embodiments, only one of the recesses 101 or 102 may be present.

The recesses 101, 102 are configured to enable a correspondingly shaped key or projection to be inserted into the recesses 101, 102 of the frame 3. The correspondingly shaped key is present in the Applicant's CCi (RTM) device.

In other embodiments, one or more of the recesses 101, 102 may be replaced with a cut-out portion at the end of one or more of the channel 31*a*, 31*b*.

Advantageously, this prevents the use of counterfeit frames and cover plates in the Applicant's apparatus.

It will be appreciated by those skilled in the art that several variations to the aforementioned embodiments are envisaged without departing from the scope of the invention.

It will also be appreciated by those skilled in the art that any number of combinations of the aforementioned features and/or those shown in the appended drawings provide clear advantages over the prior art and are therefore within the scope of the invention described herein.

What is claimed is:

1. An apparatus for securely retaining documents, the apparatus comprising a substantially planar cover plate and a receptacle, the receptacle comprising a frame and a pouch secured to the frame, the frame comprising an opening to access the pouch, the cover plate comprising a leading and a trailing end and is configured in use to cover the opening of the frame and to prevent access to the interior of the receptacle when the cover plate is in a closed position, the apparatus comprises a lock configured to irreversibly lock the cover plate in the closed position on the receptacle, wherein the lock comprises a male member and a female member, wherein the male member projects from the leading end of the cover plate and comprises:

an upstanding rib and at least one elongate flexible arm which is configured to flex in the direction of the plane of the cover plate as the cover plate is moved towards the closed position on the frame.

2. Apparatus according to claim 1, wherein said at least one elongate flexible arm comprises two or more elongate flexible arms.

3. Apparatus according to claim 1, said at least one elongate flexible arm comprises a first elongate flexible arm and a second elongate flexible arm, wherein the first elongate flexible arm and the second elongate flexible arm are configured to:

a) flex toward one another in the direction of the plane of the cover plate as the cover plate is moved to close the frame; or b) flex away from each other in the direction of the plane of the cover plate as the cover plate is moved to close the frame; or c) wherein one of the first elongate flexible arm and the second elongate flexible arm is configured to flex in a direction transverse to the plane of the cover plate as the cover plate is moved to close the frame.

4. Apparatus according to claim 3, wherein the upstanding rib is located between the first elongate flexible arm and the second elongate flexible arm.

5. Apparatus according to claim 1, wherein said at least one elongate flexible arm is at least partially hollow.

6. Apparatus according to claim 1, wherein said at least one elongate flexible arm comprises a ramp portion, wherein the ramp portion extends between a proximal portion and a free distal end of the said at least one elongate flexible arm.

7. Apparatus according to claim 1, wherein the male member comprises a base portion and wherein the base portion comprises said upstanding rib upstanding therefrom.

8. Apparatus according to claim 1, wherein the male member comprises more than one said upstanding rib and wherein the more than one said upstanding rib includes at least one central upstanding rib and at least one side portion upstanding rib.

9. Apparatus according to claim 1, wherein the female member comprises a cavity extending between an opening and an end, wherein the cavity is shaped to accommodate the male member to form an irreversible lock when the cover plate and the frame are in the closed position.

10. Apparatus according to claim 9, wherein the cavity comprises at least one retaining surface, wherein the retaining surface is arranged to engage an abutment surface of the said at least one elongate flexible arm in the closed position.

11. Apparatus according to claim 9, wherein the cavity comprises at least one ramp arranged to engage with a ramp portion of the said at least one elongate flexible arm as the cover plate engages the frame.

12. Apparatus according to claim 1, further comprising a second lock arranged to irreversibly lock the cover plate to the frame in the closed position, wherein the second lock comprises at least one biased member located on either the frame or the cover plate and biased away from or towards the pouch in an equilibrium position and an abutment surface located on the other of the cover plate and the frame, the biased member being configured to engage with the abutment surface to form an irreversible lock when the frame and the cover plate are in the closed condition.

13. Apparatus according to claim 1, wherein the frame and/or the cover plate comprise at least one recess or cut-out portion configured to interact with a correspondingly shaped key located on or in a device in which the apparatus is to be inserted.

14. An apparatus for securely retaining documents, the apparatus comprising a cover plate and a receptacle, the receptacle comprising a frame and a pouch, the frame comprising an opening to access the pouch, the cover plate being configured in use to cover the opening of the frame and to prevent access to the interior of the pouch of the receptacle when the cover plate is in a closed position, the apparatus comprises a lock in physical communication with the cover plate and configured to irreversibly lock the cover plate into the closed position on the receptacle; wherein the cover plate has a leading end and a trailing end, wherein the frame has a first end and a second end, and the first end of the frame is located adjacent the leading end of the cover plate when the cover plate is in the closed position, the frame comprising at least one recess or cut-out portion located on the first end of the frame and spaced from the lock, and the at least one recess or cut-out portion is configured to interact with a correspondingly shaped key located on or in a device in which the apparatus is to be installed.

15. A method of integrally forming a frame as a unitary item for use in an apparatus for securely retaining documents, the apparatus comprising a substantially planar cover plate and a receptacle, the receptacle comprising the frame and a pouch, the frame comprising an opening to access the pouch, the cover plate being configured in use to cover the opening of the frame and to prevent access to the interior of the pouch of the receptacle when the cover plate is in a closed position, the apparatus comprising a lock in physical communication with the cover plate and configured to irreversibly lock the cover plate into the closed position on the receptacle, wherein frame comprises a first end and a second end, and at least one elongate aperture located between the first end and the second end of the frame to enable moulding thereof, the method comprising moulding the cover plate as a unitary item, moulding the frame as a unitary item, and securing the pouch to the frame.

16. An apparatus for securely retaining documents, the apparatus comprising a cover plate and a receptacle, the receptacle comprising a frame and a pouch, the frame comprising an opening to access the pouch, the cover plate being configured in use to cover the opening of the frame and to prevent access to the interior of the pouch of the receptacle when the cover plate is in a closed position, the apparatus comprises a lock in physical communication with the cover plate and configured to irreversibly lock the cover plate into the closed position on the receptacle, wherein the frame has a first end and a second end, the frame comprising at least one recess or cut-out portion which is configured to interact with a correspondingly shaped key located on or in a device in which the apparatus is to be installed and wherein the lock includes a male member and a female member, and the male member includes an upstanding rib.

17. An apparatus for securely retaining documents, the apparatus comprising a cover plate and a receptacle, the receptacle comprising a frame and a pouch, the frame comprising an opening to access the pouch, the cover plate being configured in use to cover the opening of the frame and to prevent access to the interior of the pouch of the receptacle when the cover plate is in a closed position, the apparatus comprises a lock in physical communication with the cover plate and configured to irreversibly lock the cover plate into the closed position on the receptacle, wherein the frame has a first end and a second end, the frame comprising at least one recess or cut-out portion which is configured to interact with a correspondingly shaped key located on or in a device in which the apparatus is to be installed and wherein the lock includes a male member and a female member, and the male member includes a base portion having at least one wall upstanding therefrom.

* * * * *